(12) United States Patent
Qu et al.

(10) Patent No.: US 11,197,287 B2
(45) Date of Patent: Dec. 7, 2021

(54) METHODS AND DEVICES FOR SENDING AND RECEIVING PHYSICAL UPLINK CONTROL CHANNEL

(71) Applicant: Huawei Technologies Co., Ltd., Shenzhen (CN)

(72) Inventors: Bingyu Qu, Beijing (CN); Hao Sun, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 41 days.

(21) Appl. No.: 16/670,316

(22) Filed: Oct. 31, 2019

(65) Prior Publication Data

US 2020/0077370 A1 Mar. 5, 2020

Related U.S. Application Data

(63) Continuation of application No. PCT/CN2018/104026, filed on Sep. 4, 2018.

(30) Foreign Application Priority Data

Sep. 8, 2017 (CN) .......................... 201710807057.6

(51) Int. Cl.
*H04W 72/04* (2009.01)
*H04L 5/00* (2006.01)

(52) U.S. Cl.
CPC ......... *H04W 72/042* (2013.01); *H04L 5/0007* (2013.01); *H04L 5/0048* (2013.01)

(58) Field of Classification Search
CPC ... H04W 72/042; H04L 5/0007; H04L 5/0048
See application file for complete search history.

(56) References Cited

U.S. PATENT DOCUMENTS

| 2014/0241284 A1 | 8/2014 | Zhou |
| 2015/0189574 A1 | 7/2015 | Ng et al. |
| 2016/0337157 A1* | 11/2016 | Papasakellariou ......... H04L 27/2643 |
| 2017/0070277 A1 | 3/2017 | Si et al. |
| 2017/0093469 A1 | 3/2017 | Nazar et al. |

(Continued)

FOREIGN PATENT DOCUMENTS

| CN | 103096389 A | 5/2013 |
| CN | 105850189 A | 8/2016 |

(Continued)

OTHER PUBLICATIONS

Huawei et al.,"Discussion on sPUCCH design", 3GPP TSG RAN WG1 Meeting #87 R1-1611160, Reno, NV, USA Nov. 14-18, 2016, 6 pages.

(Continued)

*Primary Examiner* — Ronald B Abelson
(74) *Attorney, Agent, or Firm* — Slater Matsil, LLP

(57) ABSTRACT

A method for sending a physical uplink control channel includes: generating a physical uplink control channel, where the physical uplink control channel carries a demodulation reference signal and uplink control information, the physical uplink control channel is sent on a resource element set, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of the resource element set on the first time domain symbol, and the some frequency domain subcarriers are the same as frequency domain subcarriers that are occupied by the uplink control information and that are of the resource element set; and sending the physical uplink control channel.

17 Claims, 11 Drawing Sheets

(56) References Cited

U.S. PATENT DOCUMENTS

| | | | |
|---|---|---|---|
| 2017/0366380 A1* | 12/2017 | Hwang | H04L 27/26 |
| 2018/0124815 A1* | 5/2018 | Papasakellariou | H04W 72/12 |
| 2018/0199335 A1* | 7/2018 | Jung | H04W 72/04 |
| 2020/0015225 A1* | 1/2020 | Matsumura | H04W 72/0413 |
| 2020/0178222 A1* | 6/2020 | Wang | H04W 72/042 |
| 2020/0322199 A1* | 10/2020 | Matsumura | H04L 27/2613 |

FOREIGN PATENT DOCUMENTS

| | | |
|---|---|---|
| CN | 105900479 A | 8/2016 |
| CN | 106100793 A | 11/2016 |
| CN | 106850018 A | 6/2017 |
| CN | 107046513 A | 8/2017 |
| EP | 2938018 A1 | 10/2015 |
| WO | 2017098414 A1 | 6/2017 |

OTHER PUBLICATIONS

NTT Docomo, Inc., "Views on sPUCCH design," 3GPP TSG RAN WG1 Meeting #88, R1-1702784, Athens, Greece, Feb. 13-17, 2017, 7 pages.

Huawei et al., "UCI piggyback on PUSCH," 3GPP TSG RAN WG1 Meeting #90 R1-1712195, Prague, Czech Republic, Aug. 21-25, 2017, 5 pages.

ZTE et al., "sPUCCH format design," 3GPP TSG RAN WG1 Meeting #88, R1-1701973, Athens, Greece, Feb. 13-17, 2017, 6 pages.

LG Electronics, "Support of UCI piggyback on PUSCH for NR," 3GPP TSG RAN WG1 Meeting #90, R1-1713182, Prague, Czech Republic, Aug. 21-25, 2017, 6 pages.

NTT Docomo, Inc., "Ran WG's progress on NR technology SI in the February meeting," 3GPP TSG-RAN WG2 #97bis, R2-1702534, Spokane, USA, Apr. 3-78, 2017, 30 pages.

Ericsson, "Summary of the E-mail Discussion [89-21]: On Long PUCCH for NR," TSG-RAN WG1 NR AH Meeting#2, R1-1711677, Qingdao, China, Jun. 27-30, 2017, 25 pages.

Qualcomm Inc., "sPUCCH Format Design", 3GPP TSG RAN WG1 #90, R1-1712782, Prague, Czech Republic, Aug. 21-25, 2017, 5 pages.

\* cited by examiner

| a0' | a0' | a0' | DMRS | a0' | a0' | a0' |
| --- | --- | --- | --- | --- | --- | --- |
| b0' | b0' | b0' | DMRS | b0' | b0' | b0' |
| a1' | a1' | a1' | DMRS | a1' | a1' | a1' |
| b1' | b1' | b1' | DMRS | b1' | b1' | b1' |
| a2' | a2' | a2' | DMRS | a2' | a2' | a2' |
| b2' | b2' | b2' | DMRS | b2' | b2' | b2' |
| a3' | a3' | a3' | DMRS | a3' | a3' | a3' |
| b3' | b3' | b3' | DMRS | b3' | b3' | b3' |
| a4' | a4' | a4' | DMRS | a4' | a4' | a4' |
| b4' | b4' | b4' | DMRS | b4' | b4' | b4' |
| a5' | a5' | a5' | DMRS | a5' | a5' | a5' |
| b5' | b5' | b5' | DMRS | b5' | b5' | b5' |

Resource element set

FIG. 7A

| a0' | DMRS (a) | a0' | a0' | a0' | DMRS (a) | a0' |
|---|---|---|---|---|---|---|
| b0' | DMRS (b) | b0' | DMRS (b) | b0' | b0' | b0' |
| a1' | DMRS (a) | a1' | a1' | a1' | DMRS (a) | a1' |
| b1' | DMRS (b) | b1' | DMRS (b) | b1' | b1' | b1' |
| a2' | DMRS (a) | a2' | a2' | a2' | DMRS (a) | a2' |
| b2' | DMRS (b) | b2' | DMRS (b) | b2' | b2' | b2' |
| a3' | DMRS (a) | a3' | a3' | a3' | DMRS (a) | a3' |
| b3' | DMRS (b) | b3' | DMRS (b) | b3' | b3' | b3' |
| a4' | DMRS (a) | a4' | a4' | a4' | DMRS (a) | a4' |
| b4' | DMRS (b) | b4' | DMRS (b) | b4' | b4' | b4' |
| a5' | DMRS (a) | a5' | a5' | a5' | DMRS (a) | a5' |
| b5' | DMRS (b) | b5' | DMRS (b) | b5' | b5' | b5' |

METHODS AND DEVICES FOR SENDING AND RECEIVING PHYSICAL UPLINK CONTROL CHANNEL

CROSS-REFERENCE TO RELATED APPLICATIONS

This application is a continuation of International Application No. PCT/CN2018/104026, filed on Sep. 4, 2018, which claims priority to Chinese Patent Application No. 201710807057.6, filed on Sep. 8, 2017. The disclosures of the aforementioned applications are hereby incorporated by reference in their entireties.

TECHNICAL FIELD

This application relates to the field of communications technologies, and in particular, to a method and device for sending a physical uplink control channel and a method and device for receiving a physical uplink control channel.

BACKGROUND

In a 5th generation (5G) mobile communications technology, it is supported that different terminal devices can multiplex a same physical resource, and different terminal devices can use long physical uplink control channels (long PUCCH) of different lengths.

When different terminal devices multiplex a same physical resource, demodulation reference signals (DMRS) are sent in a sequence orthogonalization manner. To be specific, DMRSs sent by the terminal devices each occupy 12 corresponding resource elements (resource element, RE) on a DMRS symbol, a DMRS sequence on each DMRS symbol is a sequence whose length is 12, and cyclic shifts corresponding to sequences of DMRSs sent by the different terminal devices are different, that is, orthogonalization between the DMRSs sent by the different terminal devices is implemented through the cyclic shifts of the sequences. Orthogonalization between uplink control information sent by the terminal devices in the physical resource is implemented by using an orthogonal cover code scrambled before DFT transform. A manner of orthogonalization between uplink control information and a manner between DMRSs are different. Therefore, if two long PUCCHs of different lengths are multiplexed in a same physical resource, different DMRS symbols of the long PUCCHs need to be aligned in one slot, for example, both occupy the second symbol, the sixth symbol, or the like in 14 symbols in the one slot. Otherwise, if a DMRS sent by one terminal device is aligned with other uplink control information sent by another terminal device, orthogonalization between the DMRSs cannot be ensured, and consequently, a conflict is caused. However, if DMRSs are aligned, quantities of DMRSs included in long PUCCHs of specific lengths may not meet a performance requirement. Referring to FIG. 1, in which a slashed block represents a DMRS, when a 14-symbol long PUCCH includes four DMRSs in a long PUCCH resource, and positions of the four DMRSs are fixed on the first symbol, the fifth symbol, the eighth symbol, and the twelfth symbol, another 5-symbol long PUCCH that is multiplexed in the physical resource with the 14-symbol long PUCCH can include only one DMRS symbol on the first symbol in the physical resource, which may cause relatively poor channel estimation performance of a terminal device that uses the 5-symbol long PUCCH.

SUMMARY

This application provides a method and device for sending a physical uplink control channel and a method and device for receiving a physical uplink control channel, to improve channel estimation performance of a terminal device.

According to a first aspect, a method for sending a physical uplink control channel is provided, and the method may be performed by a terminal device. The method includes: generating a physical uplink control channel, where the physical uplink control channel carries a demodulation reference signal and uplink control information, the physical uplink control channel is sent on a resource element set, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of the resource element set on the first time domain symbol, and the some frequency domain subcarriers are the same as frequency domain subcarriers that are occupied by the uplink control information and that are of the resource element set; and sending the physical uplink control channel.

Correspondingly, according to a second aspect, a method for receiving a physical uplink control channel is provided, the method may be performed by a network device, and the network device is, for example, a base station. The method includes: receiving a physical uplink control channel sent by a terminal device, where the physical uplink control channel carries a demodulation reference signal and uplink control information, the physical uplink control channel is sent on a resource element set, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of the resource element set on the first time domain symbol, and the some frequency domain subcarriers are the same as frequency domain subcarriers that are occupied by the uplink control information and that are of the resource element set; and obtaining the demodulation reference signal and the uplink control information from the physical uplink control channel.

In this embodiment of this application, the physical uplink control channel may be sent without frequency hopping, and therefore it may be considered that the resource element set includes one resource element subset. A demodulation reference signal may occupy some frequency domain subcarriers on the first time domain symbol of the resource element set, so that a demodulation reference signal sent by one terminal device and uplink control information sent by another terminal device may be multiplexed in frequency domain. In this way, when different terminal devices perform multiplexing in a same resource element set, demodulation reference signals of the different terminal devices do not need to be aligned, so that time domain positions of the demodulation reference signals may be relatively flexible, and the terminal devices can determine a quantity of demodulation reference signals according to a status, thereby helping improve channel estimation performance of the terminal devices. The some frequency domain subcarriers are the same as the frequency domain subcarriers that are occupied by the uplink control information and that are of the resource element set, so that the some frequency domain subcarriers may be directly determined based on the frequency domain subcarriers that are occupied by the uplink control information and that are of the resource element set, which is relatively simple and direct.

With reference to the first aspect or the second aspect, in a possible design, the at least one time domain symbol further includes a second time domain symbol, and the demodulation reference signal occupies all frequency domain subcarriers of the resource element set on the second time domain symbol.

To be specific, in this embodiment of this application, the demodulation reference signal may be sent in a form of a comb, or the demodulation reference signal may be sent through occupying all frequency domain subcarriers, thereby helping implement flexible distribution of demodulation reference signals, and helping improve channel estimation performance.

According to a third aspect, a method for sending a physical uplink control channel is provided, and the method may be performed by a terminal device. The method includes: generating a physical uplink control channel, where the physical uplink control channel carries a demodulation reference signal and uplink control information, the physical uplink control channel is sent on a resource element set, the resource element set includes a first resource element subset and a second resource element subset, first frequency domain resources included in the first resource element subset are consecutive, second frequency domain resources included in the second resource element subset are consecutive, the first frequency domain resource included in the first resource element subset is the same as or different from the second frequency domain resource included in the second resource element subset, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of a resource element subset on the first time domain symbol, the some frequency domain subcarriers are the same as frequency domain subcarriers that are occupied by the uplink control information and that are of the resource element subset, and the resource element subset is the first resource element subset and/or the second resource element subset; and sending the physical uplink control channel.

Correspondingly, according to a fourth aspect, a method for receiving a physical uplink control channel is provided, the method may be performed by a network device, and the network device is, for example, a base station. The method includes: receiving a physical uplink control channel sent by a terminal device, where the physical uplink control channel carries a demodulation reference signal and uplink control information, the physical uplink control channel is sent on a resource element set, the resource element set includes a first resource element subset and a second resource element subset, first frequency domain resources included in the first resource element subset are consecutive, second frequency domain resources included in the second resource element subset are consecutive, the first frequency domain resource included in the first resource element subset is the same as or different from the second frequency domain resource included in the second resource element subset, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of a resource element subset on the first time domain symbol, the some frequency domain subcarriers are the same as frequency domain subcarriers that are occupied by the uplink control information and that are of the resource element subset, and the resource element subset is the first resource element subset and/or the second resource element subset; and obtaining the demodulation reference signal and the uplink control information from the physical uplink control channel.

In this embodiment of this application, the physical uplink control channel may alternatively be sent in a frequency hopping manner, and therefore it may be considered that the resource element set includes the first resource element subset and the second resource element subset. A demodulation reference signal may occupy some frequency domain subcarriers on the first time domain symbol of a resource element subset, so that a demodulation reference signal sent by one terminal device and uplink control information sent by another terminal device may be multiplexed in frequency domain. In this way, when different terminal devices perform multiplexing in a same resource element set, demodulation reference signals of the different terminal devices do not need to be aligned, so that time domain positions of the demodulation reference signals may be relatively flexible, and the terminal devices can determine a quantity of demodulation reference signals according to a status, thereby helping improve channel estimation performance of the terminal devices. The some frequency domain subcarriers are the same as the frequency domain subcarriers that are occupied by the uplink control information and that are of the resource element set, so that the some frequency domain subcarriers may be directly determined based on the frequency domain subcarriers that are occupied by the uplink control information and that are of the resource element set, which is relatively simple and direct.

With reference to the third aspect or the fourth aspect, in a possible design, the at least one time domain symbol further includes a second time domain symbol, and the demodulation reference signal occupies all frequency domain subcarriers of the resource element subset on the second time domain symbol.

The first time domain symbol and the second time domain symbol may be located in a same resource element subset, or may be located in different resource element subsets. This is not limited in this embodiment of this application. In this embodiment of this application, the demodulation reference signal may be sent in a form of a comb, or the demodulation reference signal may be sent through occupying all frequency domain subcarriers, thereby helping implement flexible distribution of the demodulation reference signals, and helping improve channel estimation performance.

With reference to the first aspect, the second aspect, the third aspect, or the fourth aspect, in a possible design, before generating the physical uplink control channel, the terminal device further determines, based on the frequency domain subcarriers occupied by the uplink control information, the frequency domain subcarriers occupied by the demodulation reference signal. Correspondingly, before receiving the physical uplink control channel, the network device further determines, based on the frequency domain subcarriers occupied by the uplink control information, the frequency domain subcarriers occupied by the demodulation reference signal.

In this embodiment of this application, the demodulation reference signal occupies some frequency domain subcarriers of the resource element set or the resource element subset on the first time domain symbol. Therefore, both the terminal device and the network device need to determine the some frequency domain subcarriers occupied by the demodulation reference signal, so as to determine a position of the demodulation reference signal in frequency domain. There are a plurality of manners of determining the some frequency domain subcarriers occupied by the demodulation reference signal. Because the some frequency domain subcarriers are the same as the frequency domain subcarriers that are occupied by the control information and that are of the resource element set or the resource element subset, one of the plurality of manners is that the frequency domain subcarriers occupied by the demodulation reference signal are directly determined based on the frequency domain subcarriers occupied by the uplink control information, which is relatively simple.

With reference to the first aspect, the second aspect, the third aspect, or the fourth aspect, in a possible design, before generating the physical uplink control channel, the terminal device further determines, based on a correspondence between a resource index of the physical uplink control channel and the frequency domain subcarriers occupied by the uplink control information, and the resource index of the physical uplink control channel, the frequency domain subcarriers occupied by the uplink control information. Correspondingly, before receiving the physical uplink control channel, the network device further determines, based on the correspondence between the resource index of the physical uplink control channel and the frequency domain subcarriers occupied by the uplink control information, and the resource index of the physical uplink control channel, the frequency domain subcarriers occupied by the uplink control information.

The terminal device can determine the resource index of the physical uplink control channel that is used by the terminal device to transmit the uplink control information, so that the frequency domain subcarriers occupied by the uplink control information can be determined. In addition, the terminal device can correspondingly determine the some frequency domain subcarriers after determining the frequency domain subcarriers occupied by the uplink control information. The network device may also use the determining manner.

With reference to the first aspect, the second aspect, the third aspect, or the fourth aspect, in a possible design, before generating the physical uplink control channel, the terminal device further determines the some frequency domain subcarriers based on a correspondence between the some frequency domain subcarriers and an orthogonal code corresponding to the uplink control information, and the orthogonal code. Correspondingly, before receiving the physical uplink control channel, the network device further determines the some frequency domain subcarriers based on the correspondence between the some frequency domain subcarriers and the orthogonal code corresponding to the uplink control information, and the orthogonal code.

Determining the some frequency domain subcarriers based on the correspondence between the some frequency domain subcarriers and the orthogonal code corresponding to the uplink control information is another manner of determining the some frequency domain subcarriers.

With reference to the first aspect, the second aspect, the third aspect, or the fourth aspect, in a possible design, before generating the physical uplink control channel, the terminal device further determines the orthogonal code based on a correspondence between the resource index of the physical uplink control channel and the orthogonal code corresponding to the uplink control information, and the resource index of the physical uplink control channel. Correspondingly, before receiving the physical uplink control channel, the network device further determines the orthogonal code based on the correspondence between the resource index of the physical uplink control channel and the orthogonal code corresponding to the uplink control information, and the resource index of the physical uplink control channel.

The terminal device can determine the resource index of the physical uplink control channel that is used by the terminal device to transmit the uplink control information so that the orthogonal code corresponding to the uplink control information can be determined. In addition, the terminal device can correspondingly determine the some frequency domain subcarriers after determining the orthogonal code corresponding to the uplink control information. The network device may also use the determining manner.

With reference to the first aspect, the second aspect, the third aspect, or the fourth aspect, in a possible design, in the correspondence between the some frequency domain subcarriers and the orthogonal code corresponding to the uplink control information:

when the orthogonal code is $\{+1, +1, +1, +1, +1, +1, +1, +1, +1, +1, +1, +1\}$, indexes of the some frequency domain subcarriers are $\{0, 2, 4, 6, 8, 10\}$; or when the orthogonal code used by the uplink control information is $\{+1, +1, +1, +1, +1, +1, -1, -1, -1, -1, -1, -1\}$, indexes of the some frequency domain subcarriers are $\{1, 3, 5, 7, 9, 11\}$; or when the orthogonal code is $\{+1, +1, +1, +1, +1, +1, +1, +1, +1, +1, +1, +1\}$, indexes of the some frequency domain subcarriers are $\{0, 3, 6, 9\}$; or when the orthogonal code is $\{+1, +1, +1, +1, \exp(j*4*\pi/3), \exp(j*4*\pi/3), \exp(j*4*\pi/3), \exp(j*4*\pi/3), \exp(j*2*\pi/3), \exp(j*2*\pi/3), \exp(j*2*\pi/3), \exp(j*2*\pi 3)\}$, indexes of the some frequency domain subcarriers are $\{2, 5, 8, 11\}$; or when the orthogonal code is $\{+1, +1, +1, +1, \exp(j*2*\pi/3), \exp(j*2*\pi/3), \exp(j*2*\pi/3), \exp(j*2*\pi/3), \exp(j*4*\pi/3), \exp(j*4*\pi/3), \exp(j*4*\pi/3), \exp(j*4*\pi/3)\}$, indexes of the some frequency domain subcarriers are $\{1, 4, 7, 10\}$; or when the orthogonal code is $\{+1, +1, +1, +1, +1, +1, +1, +1, +1, +1, +1, +1\}$, indexes of the some frequency domain subcarriers are $\{0, 4, 8\}$; or when the orthogonal code is $\{+1, +1, +1, +j, +j, +j, -1, -1, -1, -j, -j, -j\}$, indexes of the some frequency domain subcarriers are $\{1, 5, 9\}$; or when the orthogonal code is $\{+1, +1, +1, -1, -1, -1, +1, +1, +1, -1, -1, -1\}$, indexes of the some frequency domain subcarriers are $\{2, 6, 10\}$; or when the orthogonal code is $\{+1, +1, +1, -j, -j, -j, -1, -1, -1, +j, +j, +j\}$, indexes of the some frequency domain subcarriers are $\{3, 7, 11\}$; or when the orthogonal code is $\{+1, +1, +1, +1, +1, +1, +1, +1, +1, +1, +1, +1\}$, indexes of the some frequency domain subcarriers are $\{0, 6\}$; or when the orthogonal code is $\{+1, +1, \exp(j*1*\pi/3), \exp(j*1*\pi/3), \exp(j*2*\pi/3), \exp(j*2*\pi/3), -1, -1, \exp(j*4*\pi/3), \exp(j*4*\pi/3), \exp(j*5*\pi/3), \exp(j*5*\pi/3)\}$, indexes of the some frequency domain subcarriers are $\{1, 7\}$; or when the orthogonal code is $\{+1, +1, \exp(j*2*\pi/3), \exp(j*2*\pi/3), \exp(j*4*\pi/3), \exp(j*4*\pi/3), +1, +1, \exp(j*2*\pi/3), \exp(j*2*\pi/3), \exp(j*4*\pi/3), \exp(j*4*\pi/3)\}$, indexes of the some frequency domain subcarriers are $\{2, 8\}$; or when the orthogonal code is {+1, +1, −1, −1, +1, +1, −1, −1, +1, +1, −1, −1}, indexes of the some frequency domain subcarriers are {3, 9}; or when the orthogonal code is {+1, +1, exp(j*4*π/3), exp(j*4*π/3), exp(j*2*π/3), exp(j*2*π/3), +1, +1, exp(j*4*π/3), exp(j*4*π/3), exp(j*2*π/3), exp(j*2*π/3)}, indexes of the some frequency domain subcarriers are {4, 10}; or when the orthogonal code is {+1, +1, exp(j*5*π/3), exp(j*5*π/3), exp(j*4*π/3), exp(j*4*7π/3), −1, −1, exp(j*2*7π/3), exp(j*2*7π/3), exp(j*1*π/3), exp(j*1*π/3)}, indexes of the some frequency domain subcarriers are {5, 11}, where exp(n) represents e raised to the power of n, and j=√−1.

The foregoing provides some examples of the correspondence between the some frequency domain subcarriers and the orthogonal code corresponding to the uplink control information. In this embodiment of this application, the correspondence between the some frequency domain subcarriers and the orthogonal code corresponding to the uplink control information includes at least one of the foregoing, and may further include another correspondence that is not listed in the foregoing specification.

With reference to the first aspect, the second aspect, the third aspect, or the fourth aspect, in a possible design, before generating the physical uplink control channel, the terminal device further determines the some frequency domain subcarriers based on the correspondence between the resource index of the physical uplink control channel and the some frequency domain subcarriers, and the resource index of the physical uplink control channel. Correspondingly, before receiving the physical uplink control channel, the network device further determines the some frequency domain subcarriers based on the correspondence between the resource index of the physical uplink control channel and the some frequency domain subcarriers, and the resource index of the physical uplink control channel.

The terminal device can determine the resource index of the physical uplink control channel that is used by the terminal device to transmit the uplink control information, and therefore the terminal device can directly determine the some frequency domain subcarriers based on the resource index of the physical uplink control channel, which is relatively simple and direct.

With reference to the first aspect, the second aspect, the third aspect, or the fourth aspect, in a possible design, before generating the physical uplink control channel, the terminal device further determines the some frequency domain subcarriers based on indication of higher layer signaling or dynamic signaling. Correspondingly, before receiving the physical uplink control channel, the network device further sends the higher layer signaling or the dynamic signaling to the terminal device, where the higher layer signaling or the dynamic signaling is used to determine the some frequency domain subcarriers.

In this manner, indexes of the frequency domain subcarriers occupied by the demodulation reference signal are semi-statically indicated by the network device. The signaling has a validation period, thereby reducing overheads of the signaling.

According to a fifth aspect, a method for sending a physical uplink control channel is provided, and the method may be performed by a terminal device. The method includes: generating a physical uplink control channel, where the physical uplink control channel carries a demodulation reference signal and uplink control information, the physical uplink control channel is sent on a resource element set, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of the resource element set on the first time domain symbol, and indexes of the some frequency domain subcarriers are determined based on an orthogonal code corresponding to the uplink control information; and sending the physical uplink control channel.

Correspondingly, according to a sixth aspect, a method for receiving a physical uplink control channel is provided, the method may be performed by a network device, and the network device is, for example, a base station. The method includes: receiving a physical uplink control channel, where the physical uplink control channel carries a demodulation reference signal and uplink control information, the physical uplink control channel is sent on a resource element set, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of the resource element set on the first time domain symbol, and indexes of the some frequency domain subcarriers are determined based on an orthogonal code corresponding to the uplink control information; and obtaining the demodulation reference signal and the uplink control information from the physical uplink control channel.

In this embodiment of this application, the physical uplink control channel may be sent without frequency hopping, and therefore it may be considered that the resource element set includes one resource element subset. A demodulation reference signal may occupy some frequency domain subcarriers on the first time domain symbol of the resource element set, so that a demodulation reference signal sent by one terminal device and uplink control information sent by another terminal device may be multiplexed in frequency domain. In this way, when different terminal devices perform multiplexing in a same resource element set, demodulation reference signals of the different terminal devices do not need to be aligned, so that time domain positions of the demodulation reference signals may be relatively flexible, and the terminal devices can determine a quantity of demodulation reference signals according to a status, thereby helping improve channel estimation performance of the terminal devices. The indexes of the some frequency domain subcarriers may be determined based on the orthogonal code corresponding to the uplink control information, which is relatively simple.

With reference to the fifth aspect or the sixth aspect, in a possible design, the at least one time domain symbol further includes a second time domain symbol, and the demodulation reference signal occupies all frequency domain subcarriers of the resource element set on the second time domain symbol.

To be specific, in this embodiment of this application, the demodulation reference signal may be sent in a form of a comb, or the demodulation reference signal may be sent though occupying all frequency domain subcarriers, thereby helping implement flexible distribution of the demodulation reference signals, and helping improve channel estimation performance.

According to a seventh aspect, a method for sending a physical uplink control channel is provided, and the method may be performed by a terminal device. The method includes: generating a physical uplink control channel, where the physical uplink control channel carries a demodulation reference signal and uplink control information, the physical uplink control channel is sent on a resource element set, the resource element set includes a first resource element subset and a second resource element subset, first frequency domain resources included in the first resource element subset are consecutive, second frequency domain resources included in the second resource element subset are consecutive, the first frequency domain resource included in the first resource element subset is the same as or different from the second frequency domain resource included in the second resource element subset, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of a resource element subset on the first time domain symbol, the resource element subset is the first resource element subset and/or the second resource element subset, and indexes of the some frequency domain subcarriers are determined based on an orthogonal code corresponding to the uplink control information; and sending the physical uplink control channel.

Correspondingly, according to an eighth aspect, a method for receiving a physical uplink control channel is provided, the method may be performed by a network device, and the network device is, for example, a base station. The method includes: receiving a physical uplink control channel, where the physical uplink control channel carries a demodulation reference signal and uplink control information, the physical uplink control channel is sent on a resource element set, the resource element set includes a first resource element subset and a second resource element subset, first frequency domain resources included in the first resource element subset are consecutive, second frequency domain resources included in the second resource element subset are consecutive, the first frequency domain resource included in the first resource element subset is the same as or different from the second frequency domain resource included in the second resource element subset, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of a resource element subset on the first time domain symbol, the resource element subset is the first resource element subset and/or the second resource element subset, and indexes of the some frequency domain subcarriers are determined based on an orthogonal code corresponding to the uplink control information; and obtaining the demodulation reference signal and the uplink control information from the physical uplink control channel.

The physical uplink control channel may alternatively be sent in a frequency hopping manner, and therefore it may be considered that the resource element set includes the first resource element subset and the second resource element subset. A demodulation reference signal may occupy some frequency domain subcarriers on the first time domain symbol of a resource element subset, so that a demodulation reference signal sent by one terminal device and uplink control information sent by another terminal device may be multiplexed in frequency domain. In this way, when different terminal devices perform multiplexing in a same resource element set, demodulation reference signals of the different terminal devices do not need to be aligned, so that time domain positions of the demodulation reference signals may be relatively flexible, and the terminal devices can determine a quantity of demodulation reference signals according to a status, thereby helping improve channel estimation performance of the terminal devices.

The indexes of the some frequency domain subcarriers may be determined based on the orthogonal code corresponding to the uplink control information, which is relatively simple.

With reference to the seventh aspect or the eighth aspect, in a possible design, the at least one time domain symbol further includes a second time domain symbol, and the demodulation reference signal occupies all frequency domain subcarriers of the resource element subset on the second time domain symbol.

The first time domain symbol and the second time domain symbol may be located in a same resource element subset, or may be located in different resource element subsets. This is not limited in this embodiment of this application. In this embodiment of this application, the demodulation reference signal may be sent in a form of a comb, or the demodulation reference signal may be sent through occupying all frequency domain subcarriers, thereby helping implement flexible distribution of the demodulation reference signals, and helping improve channel estimation performance.

With reference to the fifth aspect, the sixth aspect, the seventh aspect, or the eighth aspect, in a possible design, before generating the physical uplink control channel, the terminal device further determines the some frequency domain subcarriers based on a correspondence between the some frequency domain subcarriers and the orthogonal code corresponding to the uplink control information, and the orthogonal code. Correspondingly, before receiving the physical uplink control channel, the network device further determines the some frequency domain subcarriers based on the correspondence between the some frequency domain subcarriers and the orthogonal code corresponding to the uplink control information, and the orthogonal code.

Determining the some frequency domain subcarriers based on the correspondence between the some frequency domain subcarriers and the orthogonal code corresponding to the uplink control information is a manner of determining the some frequency domain subcarriers.

With reference to the fifth aspect, the sixth aspect, the seventh aspect, or the eighth aspect, in a possible design, before generating the physical uplink control channel, the terminal device further determines the orthogonal code based on a correspondence between a resource index of the physical uplink control channel and the orthogonal code corresponding to the uplink control information, and the resource index of the physical uplink control channel. Correspondingly, before receiving the physical uplink control channel, the network device further determines the orthogonal code based on the correspondence between the resource index of the physical uplink control channel and the orthogonal code corresponding to the uplink control information, and the resource index of the physical uplink control channel.

The terminal device can determine the resource index of the physical uplink control channel that is used by the terminal device to transmit the uplink control information, so that the orthogonal code corresponding to the uplink control information can be determined. In addition, the terminal device can correspondingly determine the some frequency domain subcarriers after determining the orthogonal code corresponding to the uplink control information. The network device may also use the determining manner.

With reference to the fifth aspect, the sixth aspect, the seventh aspect, or the eighth aspect, in a possible design, in the correspondence between the some frequency domain subcarriers and the orthogonal code corresponding to the uplink control information:

when the orthogonal code is {+1, +1, +1, +1, +1, +1, +1, +1, +1, +1, +1, +1}, indexes of the some frequency domain subcarriers are {0, 2, 4, 6, 8, 10}; or when the orthogonal code used by the uplink control information is {+1, +1, +1, +1, +1, +1, −1, −1, −1, −1, −1, −1}, indexes of the some frequency domain subcarriers are {1, 3, 5, 7, 9, 11}; or when the orthogonal code is {+1, +1, +1, +1, +1, +1, +1, +1, +1, +1, +1, +1}, indexes of the some frequency domain subcarriers are {0, 3, 6, 9}; or when the orthogonal code is {+1, +1, +1, +1, exp(j*4*π/3), exp(j*4*π/3), exp(j*4*π/3), exp(j*4*π/3), exp(j*2*π/3), exp(j*2*π/3), exp(j*2*π/3), exp(j*2*π3)}, indexes of the some frequency domain subcarriers are {2, 5, 8, 11}; or when the orthogonal code is {+1, +1, +1, +1, exp(j*2*π/3), exp(j*2*π/3), exp(j*2*π/3), exp(j*2*π/3), exp(j*4*π/3), exp(j*4*π/3), exp(j*4*π/3), exp(j*4*π/3)}, indexes of the some frequency domain subcarriers are {1, 4, 7, 10}; or when the orthogonal code is {+1, +1, +1, +1, +1, +1, +1, +1, +1, +1, +1, +1}, indexes of the some frequency domain subcarriers are {0, 4, 8}; or when the orthogonal code is {+1, +1, +1, +j, +j, +j, −1, −1, −1, −j, −j, −j}, indexes of the some frequency domain subcarriers are {1, 5, 9}; or when the orthogonal code is {+1, +1, +1, −1, −1, −1, +1, +1, +1, −1, −1, −1}, indexes of the some frequency domain subcarriers are {2, 6, 10}; or when the orthogonal code is {+1, +1, +1, −j, −j, −j, −1, −1, −1, +j, +j, +j}, indexes of the some frequency domain subcarriers are {3, 7, 11}; or when the orthogonal code is {+1, +1, +1, +1, +1, +1, +1, +1, +1, +1, +1, +1}, indexes of the some frequency domain subcarriers are {0, 6}; or when the orthogonal code is {+1, +1, exp(j*1*π/3), exp(j*1*π/3), exp(j*2*π/3), exp(*2*π/3), −1, −1, exp(j*4*π/3), exp(j*4*π/3), exp(j*5*π/3), exp(j*5*π/3)}, indexes of the some frequency domain subcarriers are {1, 7}; or when the orthogonal code is {+1, +1, exp(j*2*π/3), exp(j*2*π/3), exp(j*4*π/3), exp(j*4*π/3), +1, +1, exp(j*2*π/3), exp(j*2*π/3), exp(j*4*π/3), exp(j*4*π/3)}, indexes of the some frequency domain subcarriers are {2, 8}; or when the orthogonal code is {+1, +1, −1, −1, +1, +1, −1, −1, +1, +1, −1, −1}, indexes of the some frequency domain subcarriers are {3, 9}; or when the orthogonal code is {+1, +1, exp(j*4*π/3), exp(j*4*π/3), exp(j*2*π/3), exp(*2*π/3), +1, +1, exp(j*4*π/3), exp(j*4*π/3), exp(j*2*π/3), exp(j*2*π/3)}, indexes of the some frequency domain subcarriers are {4, 10}; or when the orthogonal code is {+1, +1, exp(j*5*π/3), exp(j*5*π/3), exp(j*4*π/3), exp(*4*π/3), −1, −1, exp(j*2*π/3), exp(j*2*π/3), exp(j*1*π/3), exp(j*1*π/3)}, indexes of the some frequency domain subcarriers are {5, 11}, where exp(n) represents e raised to the power of n, and $j=\sqrt{-1}$.

The foregoing provides some examples of the correspondence between the some frequency domain subcarriers and the orthogonal code corresponding to the uplink control information. In this embodiment of this application, the correspondence between the some frequency domain subcarriers and the orthogonal code corresponding to the uplink control information includes at least one of the foregoing, and may further include another correspondence that is not listed in the foregoing specification.

According to a ninth aspect, a device for sending a physical uplink control channel is provided. The device for sending a physical uplink control channel has functions of the terminal device in the foregoing method designs. These functions may be implemented by hardware, or may be implemented by hardware executing corresponding software. The hardware or software includes one or more units that correspond to the foregoing functions.

In a possible design, a specific structure of the device for sending a physical uplink control channel may include a processor and a transceiver. The processor and the transceiver may execute corresponding functions in the method according to the first aspect or any possible design of the first aspect.

According to a tenth aspect, a device for receiving a physical uplink control channel is provided. The device for receiving a physical uplink control channel has functions of the network device in the foregoing method designs. These functions may be implemented by hardware, or may be implemented by hardware executing corresponding software. The hardware or software includes one or more units that correspond to the foregoing functions.

In a possible design, a specific structure of the device for receiving a physical uplink control channel may include a processor and a transceiver. The processor and the transceiver may execute corresponding functions in the method according to the second aspect or any possible design of the second aspect.

According to an eleventh aspect, a device for sending a physical uplink control channel is provided. The device for sending a physical uplink control channel has functions of the terminal device in the foregoing method designs. These functions may be implemented by hardware, or may be implemented by hardware executing corresponding software. The hardware or software includes one or more units that correspond to the foregoing functions.

In a possible design, a specific structure of the device for sending a physical uplink control channel may include a processor and a transceiver. The processor and the transceiver may execute corresponding functions in the method according to the third aspect or any possible design of the third aspect.

According to a twelfth aspect, a device for receiving a physical uplink control channel is provided. The device for receiving a physical uplink control channel has functions of the network device in the foregoing method designs. These functions may be implemented by hardware, or may be implemented by hardware executing corresponding software. The hardware or software includes one or more units that correspond to the foregoing functions.

In a possible design, a specific structure of the device for receiving a physical uplink control channel may include a processor and a transceiver. The processor and the transceiver may execute corresponding functions in the method according to the fourth aspect or any possible design of the fourth aspect.

According to a thirteen aspect, a device for sending a physical uplink control channel is provided. The device for sending a physical uplink control channel has functions of the terminal device in the foregoing method designs. These functions may be implemented by hardware, or may be implemented by hardware executing corresponding software. The hardware or software includes one or more units that correspond to the foregoing functions.

In a possible design, a specific structure of the device for sending a physical uplink control channel may include a processor and a transceiver. The processor and the transceiver may execute corresponding functions in the method according to the fifth aspect or any possible design of the fifth aspect.

According to a fourteenth aspect, a device for receiving a physical uplink control channel is provided. The device for receiving a physical uplink control channel has functions of the network device in the foregoing method designs. These functions may be implemented by hardware, or may be implemented by hardware executing corresponding software. The hardware or software includes one or more units that correspond to the foregoing functions.

In a possible design, a specific structure of the device for receiving a physical uplink control channel may include a processor and a transceiver. The processor and the transceiver may execute corresponding functions in the method according to the sixth aspect or any possible design of the sixth aspect.

According to a fifteenth aspect, a device for sending a physical uplink control channel is provided. The device for sending a physical uplink control channel has functions of the terminal device in the foregoing method designs. These functions may be implemented by hardware, or may be implemented by hardware executing corresponding software. The hardware or software includes one or more units that correspond to the foregoing functions.

In a possible design, a specific structure of the device for sending a physical uplink control channel may include a processor and a transceiver. The processor and the transceiver may execute corresponding functions in the method according to the seventh aspect or any possible design of the seventh aspect.

According to a sixteenth aspect, a device for receiving a physical uplink control channel is provided. The device for receiving a physical uplink control channel has functions of the network device in the foregoing method designs. These functions may be implemented by hardware, or may be implemented by hardware executing corresponding software. The hardware or software includes one or more units that correspond to the foregoing functions.

In a possible design, a specific structure of the device for receiving a physical uplink control channel may include a processor and a transceiver. The processor and the transceiver may execute corresponding functions in the method according to the eighth aspect or any possible design of the eighth aspect.

According to a seventeenth aspect, a device for sending a physical uplink control channel is provided. The device for sending a physical uplink control channel has functions of the terminal device in the foregoing method designs. These functions may be implemented by hardware, or may be implemented by hardware executing corresponding software. The hardware or software includes one or more units that correspond to the foregoing functions.

In a possible design, a specific structure of the device for sending a physical uplink control channel may include a processing module and a transceiver module. The processing module and the transceiver module may execute corresponding functions in the method according to the first aspect or any possible design of the first aspect.

According to an eighteenth aspect, a device for receiving a physical uplink control channel is provided. The device for receiving a physical uplink control channel has functions of the network device in the foregoing method designs. These functions may be implemented by hardware, or may be implemented by hardware executing corresponding software. The hardware or software includes one or more units that correspond to the foregoing functions.

In a possible design, a specific structure of the device for receiving a physical uplink control channel may include a processing module and a transceiver module. The processing module and the transceiver module may execute corresponding functions in the method according to the second aspect or any possible design of the second aspect.

According to a nineteenth aspect, a device for sending a physical uplink control channel is provided. The device for sending a physical uplink control channel has functions of the terminal device in the foregoing method designs. These functions may be implemented by hardware, or may be implemented by hardware executing corresponding software. The hardware or software includes one or more units that correspond to the foregoing functions.

In a possible design, a specific structure of the device for sending a physical uplink control channel may include a processor and a transceiver. The processing module and the transceiver module may execute corresponding functions in the method according to the third aspect or any possible design of the third aspect.

According to a twentieth aspect, a device for receiving a physical uplink control channel is provided. The device for receiving a physical uplink control channel has functions of the network device in the foregoing method designs. These functions may be implemented by hardware, or may be implemented by hardware executing corresponding software. The hardware or software includes one or more units that correspond to the foregoing functions.

In a possible design, a specific structure of the device for receiving a physical uplink control channel may include a processing module and a transceiver module. The processing module and the transceiver module may execute corresponding functions in the method according to the fourth aspect or any possible design of the fourth aspect.

According to a twenty-first aspect, a device for sending a physical uplink control channel is provided. The device for sending a physical uplink control channel has functions of the terminal device in the foregoing method designs. These functions may be implemented by hardware, or may be implemented by hardware executing corresponding software. The hardware or software includes one or more units that correspond to the foregoing functions.

In a possible design, a specific structure of the device for sending a physical uplink control channel may include a processing module and a transceiver module. The processing module and the transceiver module may execute corresponding functions in the method according to the fifth aspect or any possible design of the fifth aspect.

According to a twenty-second aspect, a device for receiving a physical uplink control channel is provided. The device for receiving a physical uplink control channel has functions of the network device in the foregoing method designs. These functions may be implemented by hardware, or may be implemented by hardware executing corresponding software. The hardware or software includes one or more units that correspond to the foregoing functions.

In a possible design, a specific structure of the device for receiving a physical uplink control channel may include a processing module and a transceiver module. The processing module and the transceiver module may execute corresponding functions in the method according to the sixth aspect or any possible design of the sixth aspect.

According to a twenty-third aspect, a device for sending a physical uplink control channel is provided. The device for sending a physical uplink control channel has functions of the terminal device in the foregoing method designs. These functions may be implemented by hardware, or may be implemented by hardware executing corresponding software. The hardware or software includes one or more units that correspond to the foregoing functions.

In a possible design, a specific structure of the device for sending a physical uplink control channel may include a processing module and a transceiver module. The processing module and the transceiver module may execute corresponding functions in the method according to the seventh aspect or any possible design of the seventh aspect.

According to a twenty-fourth aspect, a device for receiving a physical uplink control channel is provided. The device for receiving a physical uplink control channel has functions of the network device in the foregoing method designs. These functions may be implemented by hardware, or may be implemented by hardware executing corresponding software. The hardware or software includes one or more units that correspond to the foregoing functions.

In a possible design, a specific structure of the device for receiving a physical uplink control channel may include a processing module and a transceiver module. The processing module and the transceiver module may execute corresponding functions in the method according to the eighth aspect or any possible design of the eighth aspect.

According to a twenty-fifth aspect, a communications apparatus is provided. The communications apparatus may be the terminal device in the foregoing method designs, or may be a chip disposed in the terminal device. The communications apparatus includes: a memory, configured to store computer executable program code; and a processor, where the processor is coupled to the memory. The program code stored in the memory includes an instruction, and when the processor executes the instruction, the communications apparatus performs the method performed by the terminal device according to any one of the first aspect to the eighth aspect or any possible design of the first aspect to the eighth aspect.

According to a twenty-sixth aspect, a computer readable storage medium is provided. The computer readable storage medium stores an instruction, and when the instruction runs on a computer, the computer performs the method performed by the terminal device according to any one of the first aspect to the eighth aspect or any possible design of the first aspect to the eighth aspect.

According to a forty-second aspect, a computer program product including an instruction is provided. The computer program product stores the instruction, and when the instruction runs on a computer, the computer performs the method performed by the terminal device according to any one of the first aspect to the eighth aspect or any possible design of the first aspect to the eighth aspect.

In the embodiments of this application, when different terminal devices perform multiplexing in a same resource element set, demodulation reference signals of the different terminal devices do not need to be aligned, so that time domain positions of the demodulation reference signals may be relatively flexible, and the terminal devices can determine a quantity of demodulation reference signals according to a status, thereby helping improve channel estimation performance of the terminal devices.

BRIEF DESCRIPTION OF THE DRAWINGS

FIG. 7A is a schematic diagram of a resource element set during frequency hopping-free sending of a PUCCH according to an embodiment of this application;

DETAILED DESCRIPTION OF ILLUSTRATIVE EMBODIMENTS

Figure 1:
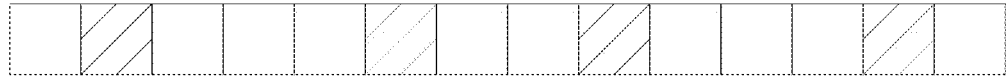
FIG. 1 is a schematic diagram of multiplexing long PUCCHs of different lengths in a same physical resource.
Figure 1:
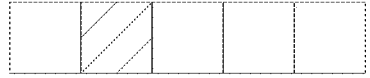

To make the objectives, technical solutions, and advantages of embodiments of this application clearer, the following further describes the embodiments of this application in detail with reference to the accompanying drawings.

In the following, some terms of the embodiments of this application are described, so as to help persons skilled in the art have a better understanding.

(1) Terminal device: It may also be referred to as a terminal, and may be a device that provides voice and/or data connectivity to a user, for example, may be a handheld device having a wireless connection function, or a processing device connected to a wireless modem. The terminal device may communicate with a core network through a radio access network (RAN), and exchange voice and/or data with the RAN. The terminal device may be user equipment (UE), a wireless terminal device, a mobile terminal device, a subscriber unit, a subscriber station, a mobile station, a mobile console, a remote station, an access point (AP), a remote terminal, an access terminal, a user terminal, a user agent, a user device, or the like. For example, the terminal device may be a mobile phone (also referred to as a "cellular" phone), a computer with a mobile terminal, a portable, pocket-sized, handheld, computer built-in, or vehicle-mounted mobile apparatus, an intelligent wearable device, and the like. For example, the terminal device may be a device such as a personal communications service (PCS) phone, a cordless telephone set, a session initiation protocol (SIP) phone, a wireless local loop (WLL) station, or a personal digital assistant (PDA), a smartwatch, a smart helmet, smart glasses, or a smart bracelet. The terminal device further includes a limited device, such as a device of low power consumption, or a device of a limited storage capacity, or a device of a limited computing capacity. For example, the terminal device includes an information sensing device, such as barcode, radio frequency identification (RFID), a sensor, a global positioning system (GPS), or a laser scanner.

(2) Network device: For example, it includes a base station (for example, an access point), and may be a device that communicates with a wireless terminal device by using one or more cells on an air interface in an access network. The base station may be configured to perform interconversion on a received over-the-air frame and an Internet Protocol (IP) packet and is used as a router between the terminal device and a remaining part of the access network, where the remaining part of the access network may include an IP network. The base station may further coordinate attribute management of the air interface. For example, the base station may include an evolved NodeB (NodeB or eNB or e-NodeB, evolutional Node B) in an LTE system or an LTE-advanced (LTE-A) system, or may further include a next generation NodeB (gNB) in a 5G NR system. This is not limited in the embodiments of this application.

(3) Physical uplink control channel: For example, it is a PUCCH, or is a long PUCCH. This is not limited in the embodiments of this application.

Figure 2:
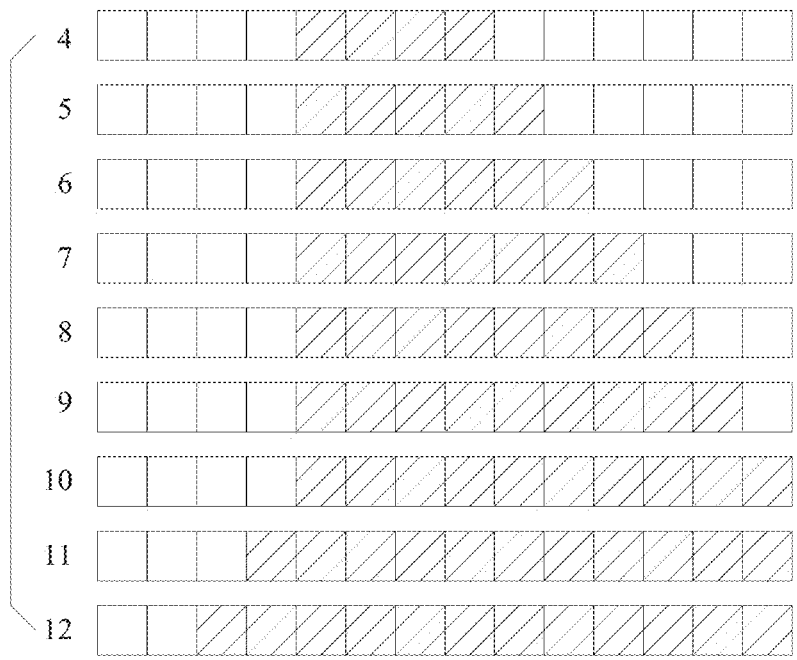
FIG. 2 is a schematic diagram of OFDM/DFT-s-OFDM symbols occupied by long PUCCHs of different lengths in time domain.
Figure 2:
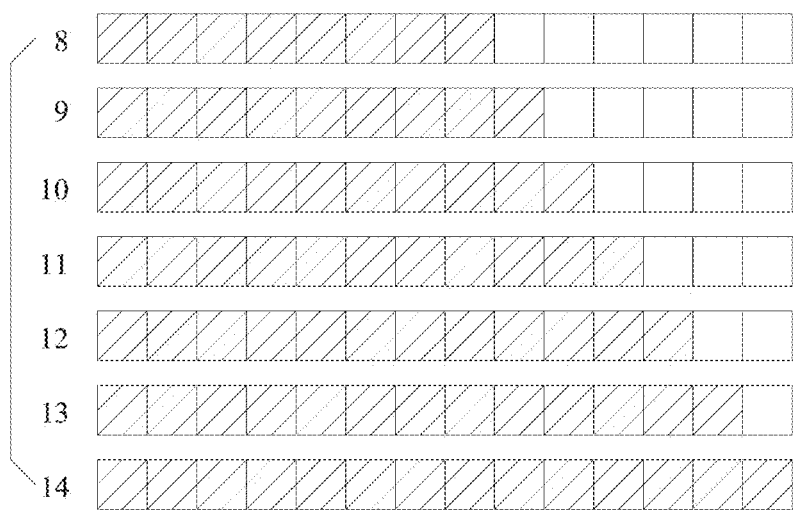

(4) Long PUCCH: Sending of a long PUCCH has been implemented in a 5G system, and the long PUCCH may occupy four, five, . . . , or fourteen orthogonal frequency division multiplexing (OFDM)/discrete Fourier transform-spread-orthogonal frequency division multiplexing (OFDM, DFT-s-OFDM) symbols in one slot in time domain. For an example of the OFDM/DFT-s-OFDM symbols occupied by the long PUCCH in time domain, refer to FIG. 2 in which slashed blocks represent the OFDM/DFT-s-OFDM symbols occupied by the long PUCCH in time domain.

The embodiments of this application describe all aspects with reference to the long PUCCH, but persons skilled in the art should know that the physical uplink control channel in the embodiments of this application is not limited to the long PUCCH, and may alternatively be, for example, a PUCCH.

(5) Demodulation reference signal: For example, the DMRS is used for related demodulation of a physical uplink shared channel (PUSCH) or a PUCCH.

6) The terms "system" and "network" may be used interchangeably in the embodiments of this application. "A plurality of" means two or more. In view of this, "a plurality of" may also be understood as "at least two" in the embodiments of this application. The term "and/or" describes an association relationship for describing associated objects and denotes that three relationships may exist. For example, A and/or B may represent the following three cases: Only A exists, both A and B exist, and only B exists. In addition, unless otherwise stated, the character "/" generally indicates an "or" relationship between associated objects.

Unless otherwise stated, ordinal numbers such as "first" and "second" mentioned in the embodiments of this application are used for differentiation between a plurality of objects, but are not intended to limit orders, time sequences, priorities, or degrees of importance of the plurality of objects.

The technical solutions provided in this specification may be applied to a 5G new radio (new radio, NR) system, or a next-generation mobile communications system, or another similar communications system.

The foregoing describes some concepts in the embodiments of this application, and the following describes a technical background of the embodiments of this application.

In the 5G system, to improve resource utilization efficiency, the long PUCCH is capable of transmitting uplink control information (UCI) of a moderate payload, and supports a specific multiplexing capacity. For example, in a PRB, the long PUCCH format that transmits the UCI of a moderate payload can transmit several to more than ten bits. In addition, in the PRB, two or more terminal devices can perform simultaneous transmission.

The long PUCCH may be sent in a length of 4 symbols to 14 symbols in time domain. Therefore, in a resource element set, long PUCCHs of different lengths may be multiplexed, for example, a 14-symbol long PUCCH and a 5-symbol long PUCCH may be multiplexed. Therefore, how to design a structure of the long PUCCH, to make long PUCCHs of different lengths multiplexed in a same physical resource is an urgent problem to be resolved.

Figures 3, 4:
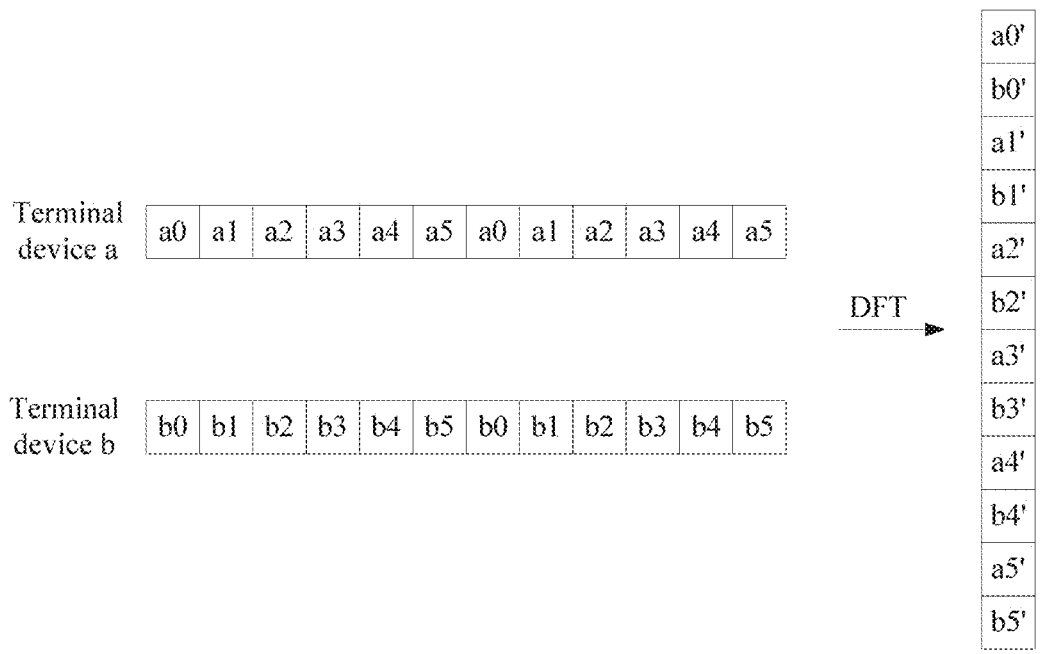
FIG. 3 is a schematic diagram of sending UCI by terminal devices during multiplexing in a same physical resource.
FIG. 4 is a schematic diagram of sending UCI and DMRSs by two terminal devices during multiplexing in a same physical resource.

In a long term evolution (LTE) system, an LTE PUCCH format 5 is supported, and this format supports simultaneous sending of the UCI by two terminal devices in a same physical resource. A method for sending the UCI on one DFT-s-OFDM symbol is: repeating modulation symbols in same signs or repeating modulation symbols in opposite signs, so that the modulation symbols form a comb in frequency domain after a 12-point discrete Fourier transform (DFT) transform. Referring to FIG. 3, for example, modulation symbols a0, a1, a2, a3, a4, a5 sent by a terminal device a are repeated in same signs, to obtain a0, a1, a2, a3, a4, a5, and modulation symbols sent by the terminal device a become a0, a1, a2, a3, a4, a5, a0, a1, a2, a3, a4, a5. 12-point DFT transform is performed on a0, a1, a2, a3, a4, a5, a0, a1, a2, a3, a4, a5 to obtain 12 elements, where values of odd-indexed elements (1, 3, 5, 7, 9, 11) are 0, and values of even-indexed elements (0, 2, 4, 6, 8, 10) are non-zero, that is, the 12 obtained elements are (a0', 0, a1', 0, a2', 0, a3', 0, a4', 0, a5', 0). Modulation symbols b0, b1, b2, b3, b4, b5 sent by a terminal device b are repeated in opposite signs, to obtain −b0, −b1, −b2, −b3, −b4, −b5, and modulation symbols sent by the terminal device b become b0, b1, b2, b3, b4, b5, −b0, −b1, −b2, −b3, −b4, −b5. 12-point DFT transform is performed on b0, b1, b2, b3, b4, b5, −b0, −b1, −b2, −b3, −b4, −b5, to obtain 12 elements, where values of odd-indexed elements (1, 3, 5, 7, 9, 11) are non-zero, and values of even-indexed elements (0, 2, 4, 6, 8, 11) are 0, that is, the 12 obtained elements are (0, b0', 0, b1', 0, b2', 0, b3', 0, b4', 0, b5'). Therefore, information sent on one symbol after the terminal device a and the terminal device b perform multiplexing is (a0', b0', a1', b1', a2', b2', a3', b3', a4', b4', a5', b5'), as shown on the right side in FIG. 3. When two long PUCCHs of different lengths are multiplexed in a same physical resource, uplink control information interference between terminal devices can be avoided through frequency-domain orthogonalization in this "comb" sending structure. The comb may be vividly understood as follows: Uplink control information sent by a terminal device is distributed at a same spacing in REs corresponding to an OFDM symbol or a DFT-s-OFDM symbol, which is similar to a comb.

Although the LTE PUCCH format 5 can ensure UCI orthogonalization between long PUCCHs of different lengths, a DMRS is sent in a sequence orthogonalization manner. To be specific, a DMRS sent by each terminal device occupies 12 REs on a DMRS symbol, each DMRS may be considered as a sequence whose length is 12, and cyclic shifts corresponding to sequences of DMRSs sent by the different terminal devices are different, that is, orthogonalization between the DMRSs sent by the different terminal devices is implemented by using the cyclic shifts of the sequences. It can be learned that an orthogonalization manner of the DMRS is different from an orthogonalization manner of the UCI. Therefore, if two long PUCCHs of different lengths are multiplexed in a same physical resource, different DMRS symbols of the long PUCCHs need to be aligned in one slot, for example, both occupy the second symbol, the third symbol, the sixth symbol, or the like in 14 symbols in the slot. FIG. 4 is an example of multiplexing of the terminal device a and the terminal device b mentioned in the foregoing example. In FIG. 4, that the DMRS occupies the third symbol in one slot is used as an example. Otherwise, if a DMRS sent by one terminal device is aligned with other uplink control information sent by another terminal device, orthogonalization between the DMRSs cannot be ensured, and consequently, a conflict is caused. However, if DMRSs are aligned, quantities of DMRSs included in long PUCCHs of specific lengths may not meet a performance requirement. Still referring to FIG. 1, when positions of DMRSs of a 14-symbol long PUCCH are fixed on the first symbol, the fifth symbol, the eighth symbol, and the twelfth symbol, another 5-symbol long PUCCH that is multiplexed in the physical resource with the 14-symbol long PUCCH can include only one DMRS symbol, which may cause relatively poor channel estimation performance of a terminal device that uses the 5-symbol long PUCCH.

In view of this, the technical solutions of the embodiments of this application are provided, to improve channel estimation performance of a terminal device.

Figure 5:
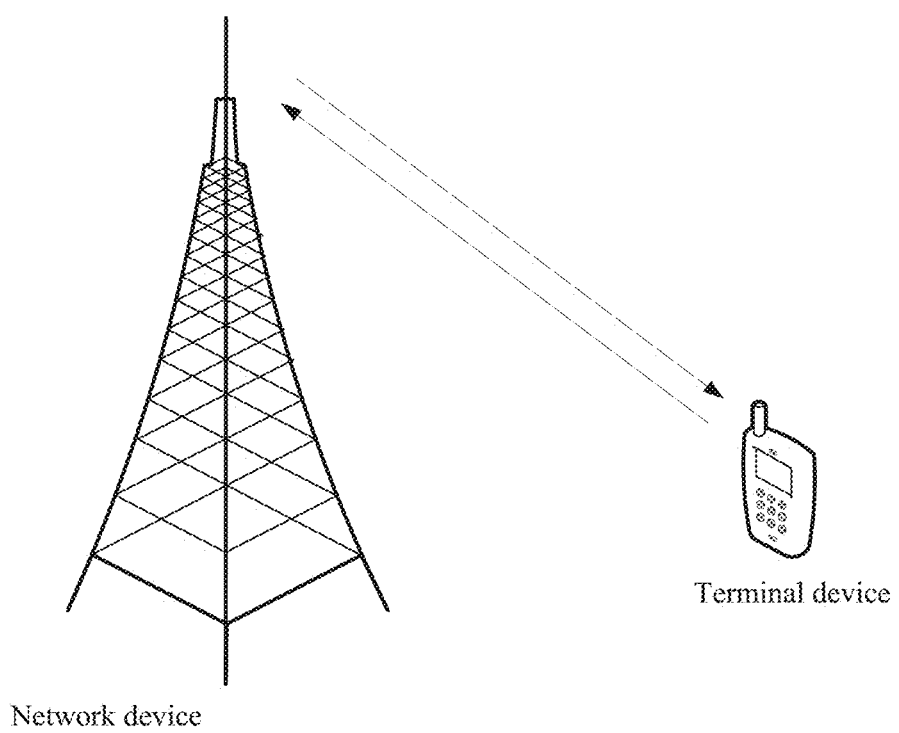
FIG. 5 is a schematic diagram of an application scenario according to an embodiment of this application.

The following describes an application scenario according to an embodiment of this application. FIG. 5 is a schematic diagram of the application scenario. A network device and a terminal device are included in FIG. 5, and the network device and the terminal device can implement information exchange. For example, the terminal device may generate a physical uplink control channel, and send the physical uplink control channel to the network device, and the network device may receive the physical uplink control channel sent by the terminal device. The network device in FIG. 5 may be an access network (AN) device, for example, a base station. The solutions in this embodiment of this application mostly relate to access network devices and terminal devices. Therefore, a core network device is not shown in FIG. 5. The access network device is, for example, a gNB in an NR system.

Figure 6:
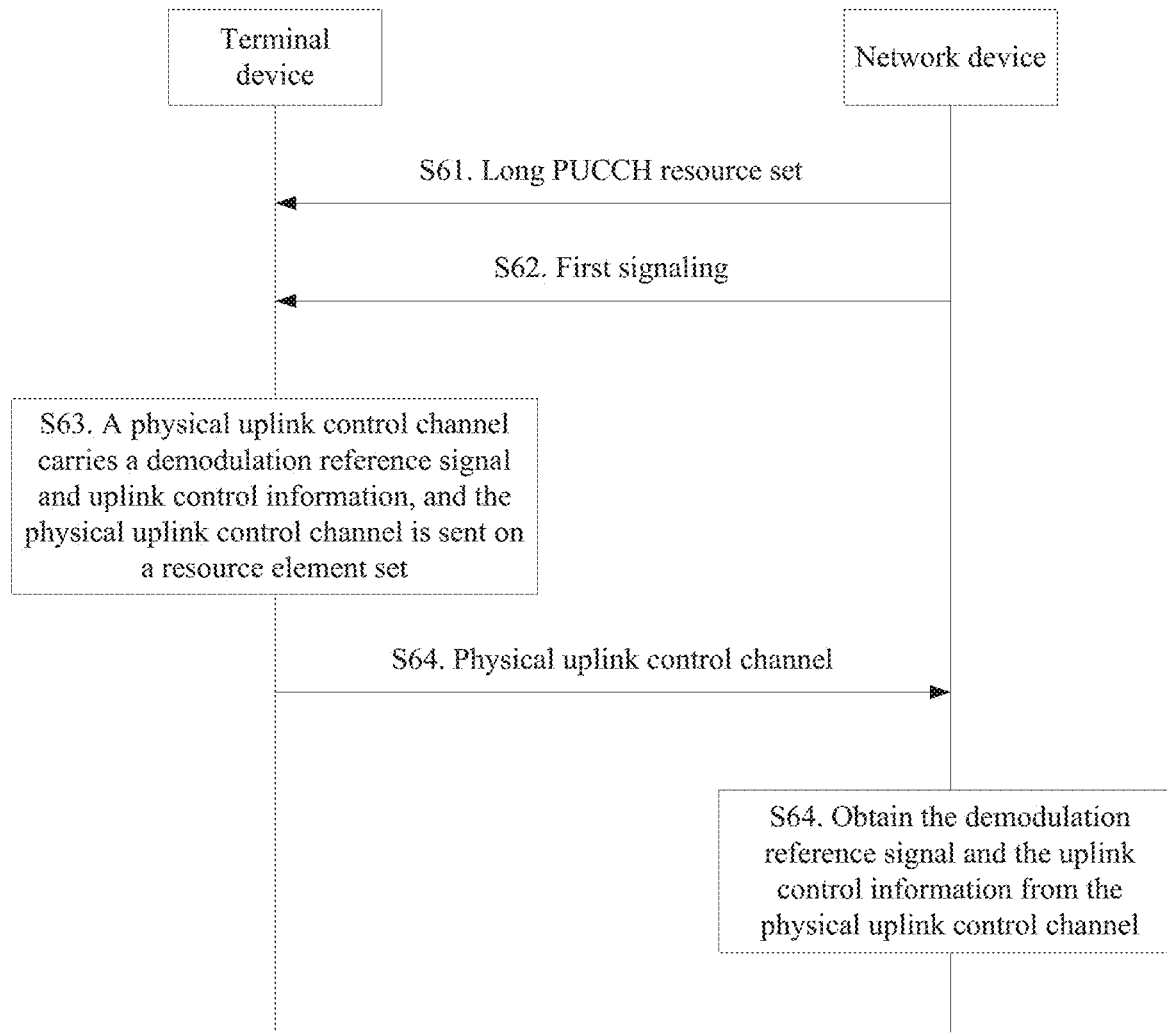
FIG. 6 is a flowchart of a method for sending a physical uplink control channel and a method for receiving a physical uplink control channel according to an embodiment of this application.

FIG. 6 shows a method for sending a physical uplink control channel according to this embodiment of this application. In a description process below, that the method is applied to the application scenario in FIG. 5 is used as an example. A procedure of the method is described as follows.

S61. When a terminal device accesses a network or after a terminal device accesses a network, a network device configures a long PUCCH resource set for the terminal device, and the terminal device determines the long PUCCH resource set configured by the network device.

For example, the network device may configure the long PUCCH resource set for the terminal device by using higher layer signaling, and the terminal device may determine the long PUCCH resource set after receiving the higher layer signaling sent by the network device. The higher layer signaling is, for example, radio resource control (RRC) signaling.

Alternatively, the network device may configure the long PUCCH resource set for the terminal device by using message (Msg) 2 or Msg 4 signaling in an initial access process, and the terminal device may determine the long PUCCH resource set after receiving the Msg 2 or Msg 4 signaling sent by the network device.

The resource set may include at least one long PUCCH resource. Optionally, the resource set may include two long PUCCH resources, four long PUCCH resources, seven long PUCCH resources, or eight long PUCCH resources. This is not limited in this embodiment of this application. After the resource set is configured for the terminal device, the terminal device may send long PUCCHs by using a PUCCH resource in the resource set subsequently.

S62. The network device sends first signaling to the terminal device, and the terminal device receives the first signaling.

For example, the first signaling is a higher layer signaling, for example, an RRC signaling. The first signaling may instruct the terminal device to send a signal such as periodic channel state information (CSI) to the network device, and indicate a long PUCCH resource used by the signal.

For another example, the first signaling may alternatively be, for example, signaling carried in a physical downlink control channel, and the physical downlink control channel is, for example, a physical downlink control channel (PDCCH). For example, the first signaling is downlink control information (DCI). The first signaling may be used to schedule downlink data for the terminal device, and indicate a long PUCCH resource used to feed back reply information to the downlink data in an explicit or implicit manner. The reply information is, for example, an acknowledgement (ACK)/a negative acknowledgement (NACK). If the first signaling is the DCI, after sending the first signaling to the terminal device, the network device further sends downlink data to the terminal device through a physical downlink shared channel and notifies the terminal device, in an explicit manner by using a field in the DCI, of a long PUCCH resource used to feed back reply information to the downlink data. The physical downlink shared channel is, for example, a physical downlink shared channel (PDSCH). The terminal device may receive the downlink data through the PDSCH, and the terminal device feeds back the reply information corresponding to the downlink data through the PUCCH.

Certainly, the first signaling may further have another implementation form, and this is not limited in this embodiment of this application.

Both S61 and S62 are optional steps.

S63. The terminal device generates a physical uplink control channel.

The physical uplink control channel carries a demodulation reference signal and uplink control information, the physical uplink control channel is sent on a resource element set, and the resource element set is used to transmit the PUCCH. If the PUCCH is sent without frequency hopping, the resource element set occupies at least two time domain symbols in time domain, frequency domain resources included in the resource element set are consecutive, the demodulation reference signal is located on at least one time domain symbol of the resource element set, the at least one time domain symbol includes a first time domain symbol, and the demodulation reference signal occupies some frequency domain subcarriers of the resource element set on the first time domain symbol. For example, referring to FIG. 7A, if the PUCCH is sent without frequency hopping, the resource element set may occupy 14 time domain symbols in time domain, namely, a time domain symbol 0 to a time domain symbol 13 in FIG. 7B, and the resource element set may occupy 12 frequency domain subcarriers in frequency domain, namely, a frequency domain subcarrier 0 to a frequency domain subcarrier 11 in FIG. 7B. Alternatively, the resource element set may occupy another quantity of time domain symbols in time domain, for example, seven time domain symbols. This is not limited in this embodiment of this application.

It should be noted that, the resource element set occupies at least two time domain symbols in time domain. Therefore, that the demodulation reference signal occupies some frequency domain subcarriers of the resource element set on the first time domain symbol means that the demodulation reference signal occupies some frequency domain subcarriers of frequency domain subcarriers that correspond to the first time domain symbol and that are in the resource element set, and does not mean that the resource element set includes only frequency domain subcarriers on the first time domain symbol.

For example, the physical uplink control channel is sent on the resource element set, the resource element set occupies at least two time domain symbols in time domain, the resource element set occupies consecutive frequency domain subcarriers in frequency domain, the demodulation reference signal is located on at least one time domain symbol of the resource element set, the at least one time domain symbol includes the first time domain symbol, and the demodulation reference signal occupies some frequency domain subcarriers of the resource element set on the first time domain symbol.

In other words, on the first time domain symbol, the demodulation reference signal does not occupy all frequency domain subcarriers included in the resource element set, but occupies some frequency domain subcarriers of the all frequency domain subcarriers included in the resource element set.

The first time domain symbol may include one or more time domain symbols. If the first time domain symbol includes one time domain symbol, the demodulation reference signal occupies some frequency domain subcarriers of the resource element set on the time domain symbol; or if the first time domain symbol includes a plurality of time domain symbols, the demodulation reference signal occupies some frequency domain subcarriers of the resource element set on each of the plurality of time domain symbols.

For example, the at least one time domain symbol further includes a second time domain symbol, and the demodulation reference signal occupies all frequency domain subcarriers of the resource element set on the second time domain symbol. For example, if the resource element set occupies a time domain symbol 0 to a time domain symbol 6 in time domain, and occupies a frequency domain subcarrier 0 to a frequency domain subcarrier 11 in frequency domain, and the demodulation reference signal is located on the symbol 1 and the symbol 5 in the time domain symbol 0 to the time domain symbol 6, the demodulation reference signal occupies some frequency domain subcarriers of the resource element set on the symbol 1. The symbol 1 is the first time domain symbol, and the symbol 5 is the second time domain symbol. For example, indexes of frequency domain subcarriers occupied by the demodulation reference signal on the symbol 1 are {0, 2, 4, 6, 8, 10}, and frequency domain subcarriers occupied by the demodulation reference signal on the symbol 5 are the frequency domain subcarrier 0 to the frequency domain subcarrier 11. To be specific, in this embodiment of this application, the demodulation reference signal may be sent in a form of a comb, or the demodulation reference signal may be sent through occupying all frequency domain subcarriers, thereby helping implement flexible distribution of demodulation reference signals, and helping improve channel estimation performance.

The foregoing describes a case in which the PUCCH is sent without frequency hopping. If the PUCCH is sent in a frequency hopping manner, the resource element set also occupies at least two time domain symbols in time domain. For example, the resource element set may occupy 4 to 14 time domain symbols in time domain. The resource element set includes a first resource element subset and a second resource element subset, and the first resource element subset and the second resource element subset occupy different time domain symbols in time domain. Frequency domain resources included in the first resource element subset are referred to as first frequency domain resources, and the first frequency domain resources are consecutive. Frequency domain resources included in the second resource element subset are referred to as second frequency domain resources, and the second frequency domain resources are consecutive. In addition, the first frequency domain resource included in the first resource element subset is the same as or different from the second frequency domain resource included in the second resource element subset. The resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of a resource element subset on the first time domain symbol, the some frequency domain subcarriers are the same as frequency domain subcarriers that are occupied by the uplink control information and that are of the resource element subset, and the resource element subset is the first resource element subset and/or the second resource element subset.

Figure 7A:
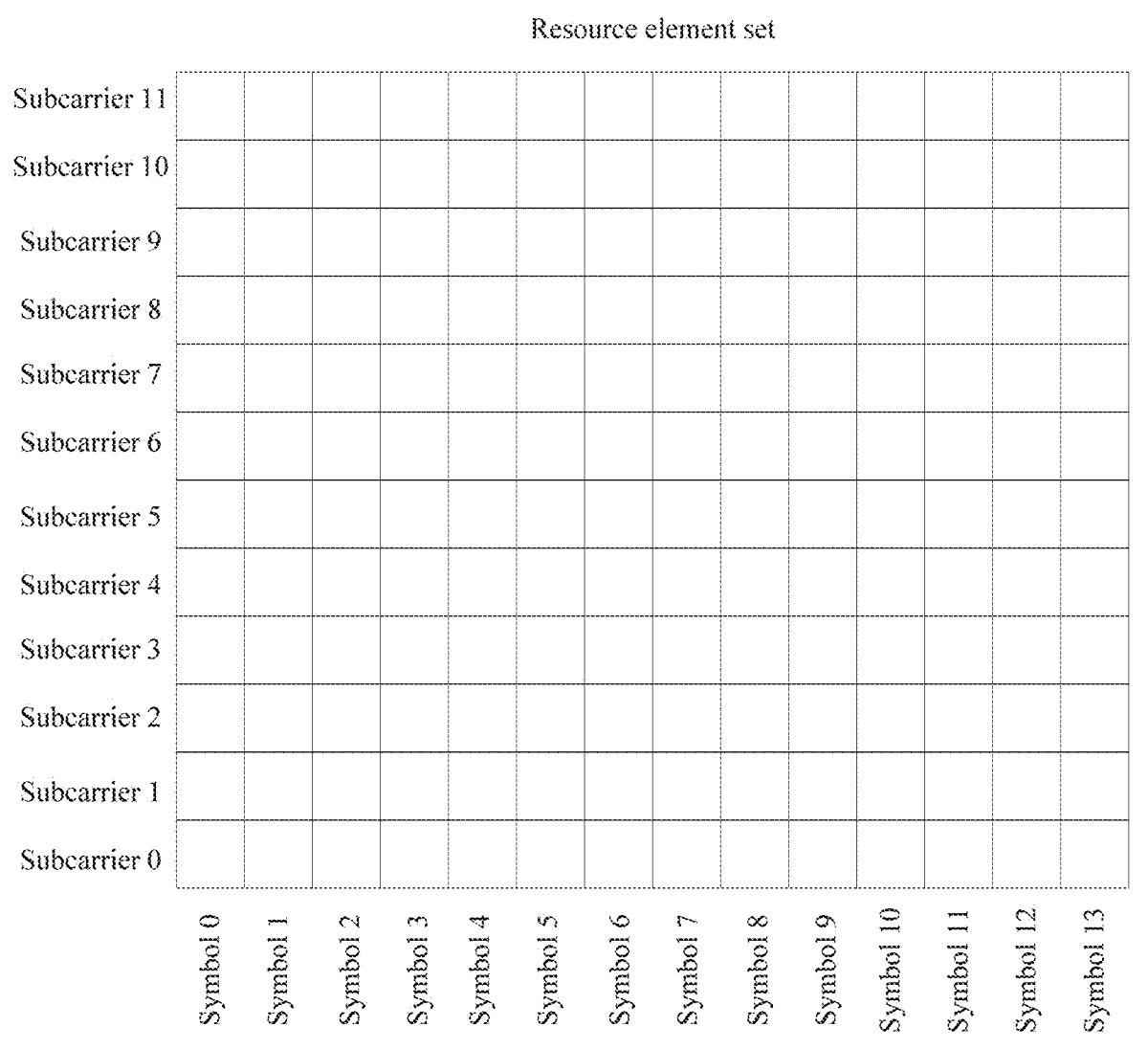
Figure 7B:
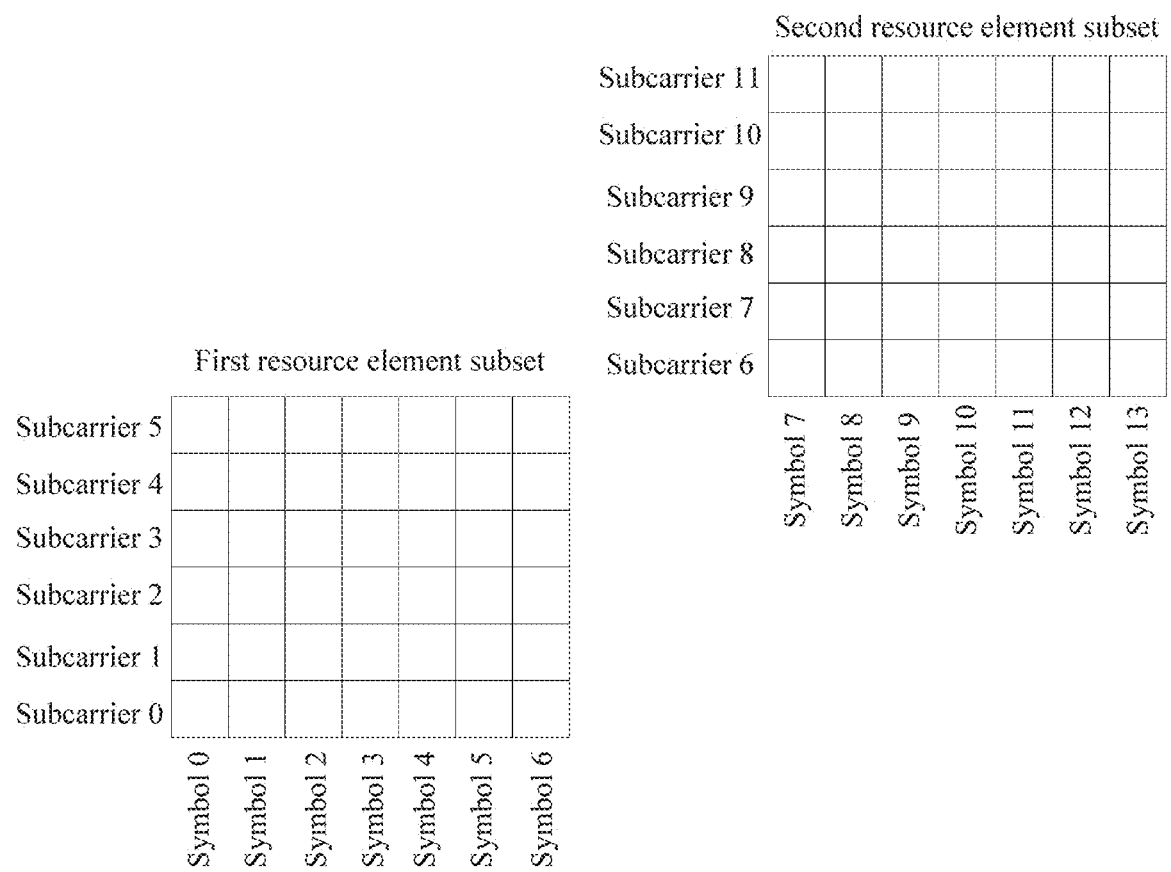
FIG. 7B is a schematic diagram of a resource element set during frequency-hopping sending of a PUCCH according to an embodiment of this application.

Referring to FIG. 7B, for example, the first resource element subset occupies a time domain symbol 0 to a time domain symbol 6 in time domain, the second resource element subset occupies a time domain symbol 7 to a time domain symbol 13 in time domain, and the first resource element subset and the second resource element subset occupy a total of 14 symbols. In FIG. 7A, that the first frequency domain resource is different from the second frequency domain resource is used as an example, in which the first frequency domain resource includes a frequency domain subcarrier 0 to a frequency domain subcarrier 5, and the second frequency domain resource includes a frequency domain subcarrier 6 to a frequency domain subcarrier 11.

For example, the resource element subset is the first resource element subset, and indexes of the frequency domain subcarriers that are occupied by the uplink control information and that are of the first resource element subset are {0, 2, 4, 6, 8, 10}, and indexes of the frequency domain subcarriers that are occupied by the demodulation reference signal and that are of the first resource element subset are also {0, 2, 4, 6, 8, 10}.

Alternatively, the resource element subset is the second resource element subset, and indexes of the frequency domain subcarriers that are occupied by the uplink control information and that are of the second resource element subset are {12, 14, 16, 18, 20, 22}, and indexes of the frequency domain subcarriers that are occupied by the demodulation reference signal and that are of the first resource element subset are also {12, 14, 16, 18, 20, 22}.

Alternatively, the resource element subset is the first resource element subset and the second resource element subset, indexes of frequency domain subcarriers that are occupied by the uplink control information and that are of the first resource element subset are {0, 2, 4, 6, 8, 10}, indexes of frequency domain subcarriers that are occupied by the uplink control information and that are of the second resource element subset are {12, 14, 16, 18, 20, 22}, indexes of frequency domain subcarriers that are occupied by the demodulation reference signal and that are of the first resource element subset are {0, 2, 4, 6, 8, 10}, and indexes of frequency domain subcarriers that are occupied by the demodulation reference signal and that are of the second resource element subset are {12, 14, 16, 18, 20, 22}.

To be specific, that the some frequency domain subcarriers are the same as frequency domain subcarriers that are occupied by the uplink control information and that are of the resource element subset means that from a perspective of a same resource element subset, the some frequency domain subcarriers are the same as the frequency domain subcarriers occupied by the uplink control information.

Similarly, the resource element set occupies at least two time domain symbols in time domain. Therefore, that the demodulation reference signal occupies some frequency domain subcarriers of one resource element set on the first time domain symbol means that the demodulation reference signal occupies some frequency domain subcarriers of frequency domain subcarriers that correspond to the first time domain symbol and that are in the resource element set, and does not mean that the resource element set includes only frequency domain subcarriers on the first time domain symbol.

For example, the physical uplink control channel is sent on the first resource element subset and the second resource element subset, each of the two resource element subsets occupies at least two time domain symbols in time domain, and the demodulation reference signal is located on at least one time domain symbol of the resource element set. The following three cases are included. 1. The demodulation reference signal is located on at least one time domain symbol of the first resource element subset. 2. The demodulation reference signal is located on at least one time domain symbol of the second resource element subset. 3. The demodulation reference signal is located on the first resource element subset and the second resource element subset, and the first resource element subset and the second resource element subset occupy a total of at least one time domain symbol. The at least one time domain symbol includes the first time domain symbol, and the demodulation reference signal occupies, on the first time domain symbol, some of frequency domain subcarriers included in the corresponding resource element subset. For example, the demodulation reference signal is located on at least one time domain symbol of the first resource element subset, and the demodulation reference signal occupies some subcarriers of the first resource element subset on the first time domain symbol. Alternatively, the demodulation reference signal is located on at least one time domain symbol of the second resource element subset, and the demodulation reference signal occupies some frequency domain subcarriers of the second resource element subset on the first time domain symbol. Alternatively, the demodulation reference signal is located on at least one time domain symbol of the first resource element subset and the second resource element subset, the first time domain symbol may include at least two time domain symbols, the demodulation reference signal occupies some frequency domain subcarriers of the first resource element subset on the first time domain symbol that is located in the first resource element subset, and occupies some frequency domain subcarriers of the second resource element subset on the first time domain symbol that is located in the second resource element subset.

In other words, on the first time domain symbol, the demodulation reference signal does not occupy all frequency domain subcarriers included in the corresponding resource element subset, but occupies some of all the frequency domain subcarriers included in the corresponding resource element subset.

The first time domain symbol may include one or more time domain symbols. If the first time domain symbol includes one time domain symbol, the demodulation reference signal occupies some frequency domain subcarriers of the corresponding resource element subset on the time domain symbol. As mentioned above, the first time domain symbol may include a plurality of time domain symbols. If the first time domain symbol includes a plurality of time domain symbols, the demodulation reference signal occupies some frequency domain subcarriers of the corresponding resource element subset on each of the plurality of time domain symbols.

Herein, the corresponding resource element subset may be understood as a resource element subset including the first time domain symbol. For example, if a resource element subset occupies a time domain symbol 0 to a time domain symbol 6 in time domain, and occupies a frequency domain subcarrier 0 to a frequency domain subcarrier 11 in frequency domain, and the demodulation reference signal is located on a symbol 1 in the time domain symbol 0 to the time domain symbol 6, the demodulation reference signal occupies some frequency domain subcarriers of the resource element subset on the symbol 1. For example, indexes of frequency domain subcarriers occupied by the demodulation reference signal on the symbol 1 are {0, 2, 4, 6, 8, 10}.

In addition, on one physical uplink control channel, the uplink control information and the demodulation reference signal occupy different time domain symbols.

For example, the at least one time domain symbol further includes a second time domain symbol, and the demodulation reference signal occupies all frequency domain subcarriers of the resource element subset on the second time domain symbol. For example, if the resource element set occupies a time domain symbol 0 to a time domain symbol 13 in time domain, and occupies a frequency domain subcarrier 0 to a frequency domain subcarrier 11 in frequency domain. The demodulation reference signal is located on the symbol 1 and the symbol 8 in the time domain symbol 0 to the time domain symbol 13, the symbol 1 is the first time domain symbol, and the symbol 8 is the second time domain symbol. The demodulation reference signal occupies some frequency domain subcarriers of the resource element set on the symbol 1. For example, indexes of frequency domain subcarriers occupied by the demodulation reference signal on the symbol 1 are {0, 2, 4, 6, 8, 10}, and frequency domain subcarriers occupied by the demodulation reference signal on the symbol 8 are the frequency domain subcarrier 0 to the frequency domain subcarrier 11. To be specific, in this embodiment of this application, the demodulation reference signal may be sent in a form of a comb, or the demodulation reference signal may be sent through occupying all frequency domain subcarriers, thereby helping implement flexible distribution of the demodulation reference signals, and helping improve channel estimation performance.

In addition, the first time domain symbol and the second time domain symbol may be located in a same resource element subset, or may be located in different resource element subsets. For example, both the first time domain symbol and the second time domain symbol may be located in the first resource element subset or the second resource element subset. In this case, if a third time domain symbol in a resource element subset that does not include the first time domain symbol and the second time domain symbol may also carry a demodulation reference signal, and the demodulation reference signal may occupy, on the third time domain symbol, some or all of frequency domain subcarriers of the resource element subset that does not include the first time domain symbol and the second time domain symbol. Alternatively, the first time domain symbol is located in the first resource element subset, and the second time domain symbol is located in the second resource element subset; or the first time domain symbol is located in the second resource element subset, and the second time domain symbol is located in the first resource element subset. This is not limited in this embodiment of this application.

One RE may include one OFDM symbol or DFT-s-OFDM symbol in time domain, and one subcarrier in frequency domain.

A time domain symbol is, for example, an OFDM symbol or a DFT-s-OFDM symbol.

If the first signaling in S62 is the higher layer signaling, the uplink control information may include information such as the CSI; or if the first signaling in S62 is the DCI, the uplink control information may include information such as an ACK/a NACK.

In this embodiment of this application, the DMRS occupies some frequency domain subcarriers of the resource element set or the resource element subset on the first time domain symbol. Therefore, the terminal device needs to determine the some frequency domain subcarriers occupied by the DMRS, so as to determine a position of the DMRS in frequency domain. Therefore, before S63, that is, before the terminal device generates the physical uplink control channel, the terminal device first needs to determine the some frequency domain subcarriers. The following describes manners of first determining the some frequency domain subcarriers by the terminal device.

For example, in this embodiment of this application, the some frequency domain subcarriers occupied by the demodulation reference signal may be determined according to a subcarrier principle. The subcarrier principle is as follows: The some frequency domain subcarriers are the same as the frequency domain subcarriers that are occupied by the uplink control information and that are of the resource element set or the resource element subset.

Whether two frequency domain subcarriers are the same may be determined by determining frequency domain indexes of the frequency domain subcarriers. If frequency domain indexes of the two frequency domain subcarriers are the same, it indicates that the two frequency domain subcarriers are the same. That frequency domain indexes are the same herein has two different cases.

Case 1: In a resource element set, frequency domain subcarriers corresponding to each OFDM symbol or each DFT-s-OFDM symbol are numbered independently. For example, the frequency domain subcarriers corresponding to each OFDM symbol or each DFT-s-OFDM symbol are numbered 0 to 11 in ascending order.

In this case, frequency domain indexes of the frequency domain subcarriers that are occupied by the DMRS and that are of the resource element set are the same as frequency domain indexes of the frequency domain subcarriers that are occupied by the uplink control information and that are of the resource element set. For example, if the frequency domain indexes of the frequency domain subcarriers that are occupied by the DMRS and that are of the resource element set are {1, 3, 5, 7, 9, 11}, the frequency domain indexes of the frequency domain subcarriers that are occupied by the uplink control information and that are of the resource element set are also {1, 3, 5, 7, 9, 11}. However, an OFDM symbol or a DFT-s-OFDM symbol in the resource element set that is occupied by the DMRS is different from that occupied by the uplink control information.

In the description below, unless otherwise stated, examples of the indexes are given in a form of case 1.

Case 2: In a resource element set, frequency domain subcarriers corresponding to each OFDM symbol or each DFT-s-OFDM symbol are not numbered independently, and frequency domain subcarriers of the entire resource element set are numbered in a unified manner. For example, in a resource element set and in ascending order of frequencies, frequency domain subcarriers corresponding to the $0^{th}$ OFDM symbol or the $0^{th}$ DFT-s-OFDM symbol are numbered 0 to 11, frequency domain subcarriers corresponding to the first OFDM symbol or the first DFT-s-OFDM symbol are numbered 12 to 23, and so on.

In this case, a result obtained after mod 12 performed on frequency domain indexes of the frequency domain subcarriers that are occupied by the DMRS and that are of the resource element set is the same as a result of mod 12 performed on frequency domain indexes of the frequency domain subcarriers that are occupied by the uplink control information and that are of the resource element set. For example, the frequency domain indexes of the frequency domain subcarriers that are occupied by the DMRS and that are of the resource element set are {1, 3, 5, 7, 9, 11}, and {1, 3, 5, 7, 9, 11} is obtained after mod 12 is performed on 1, 3, 5, 7, 9, and 11 separately; and the frequency domain indexes of the frequency domain subcarriers that are occupied by the uplink control information and that are of the resource element set are {13, 15, 17, 19, 21, 23}, and {1, 3, 5, 7, 9, 11} is also obtained after mod 12 is performed on 13, 15, 17, 19, 21, and 23 separately. It can be learned that the result of mod 12 performed on the frequency domain indexes of the frequency domain subcarriers that are occupied by the DMRS and that are of the resource element set is the same as the result of mod 12 performed on the frequency domain indexes of the frequency domain subcarriers that are occupied by the uplink control information and that are of the resource element set.

For another example, in this embodiment of this application, the some frequency domain subcarriers occupied by the demodulation reference signal may alternatively be determined according to an orthogonal cover code (OCC) principle. An orthogonal cover code is referred to as an orthogonal code for short below, and the orthogonal cover code principle may also be referred to as an orthogonal code principle for short. The orthogonal code principle is as follows: Indexes of the some frequency domain subcarriers are determined based on an orthogonal code corresponding to the uplink control information, that is, the indexes of the some frequency domain subcarriers are determined based on the orthogonal code corresponding to the uplink control information.

The foregoing describes two principles of determining the some frequency domain subcarriers, and the following describes how the terminal device determines the some frequency domain subcarriers according to the foregoing two principles. The some frequency domain subcarriers may be determined by determining the indexes of the some frequency domain subcarriers. According to the foregoing two principles, the terminal device may determine the some frequency domain subcarriers in different manners that are described below.

1. Direct Determining Manner

In the direct determining manner, the terminal device determines, based on the frequency domain subcarriers occupied by the uplink control information, the frequency domain subcarriers occupied by the demodulation reference signal. It can be learned that the frequency domain subcarriers occupied by the uplink control information are required in the direct determining manner. For example, the terminal device may determine, based on a correspondence between a resource index of the physical uplink control channel (PUCCH index) and the frequency domain subcarriers occupied by the uplink control information, and the resource index of the physical uplink control channel, the frequency domain subcarriers occupied by the uplink control information.

When sending the physical uplink control channel to the network device, the terminal device needs to send the DMRS to the network device through the physical uplink control channel, and further needs to send the uplink control information to the network device through the physical uplink control channel. For example, if the first signaling in S62 is the higher layer signaling, the uplink control information may include the CSI; or if the first signaling in S62 is the signaling carried in the physical downlink control channel, the uplink control information may include the reply information, for example, an ACK/a NACK.

Specifically, the terminal device may determine, based on an explicit or implicit indication in dynamic signaling in S62, the resource index of the physical uplink control channel used by the terminal device to transmit the uplink control information, and directly determine, based on the resource index of the physical uplink control channel, frequency domain subcarriers used to transmit the uplink control information. The protocol may predefine a correspondence between the some frequency domain subcarriers and the frequency domain subcarriers used by the uplink control information and a correspondence between the resource index of the physical uplink control channel and the frequency domain subcarriers used by the uplink control information. Alternatively, these two correspondences may be preset by the network device, or pre-negotiated and determined by the network device and the terminal device. This is not limited in this embodiment of this application. In conclusion, the terminal device may prestore the correspondence between the some frequency domain subcarriers and the frequency domain subcarriers used by the uplink control information and the correspondence between the resource index of the physical uplink control channel and the frequency domain subcarriers used by the uplink control information, so that the terminal device can determine the some frequency domain subcarriers occupied by the DMRS.

For example, when the PUCCH is sent without frequency hopping, and a resource element set includes two combs, an implementation is as follows: Indexes that are of the frequency domain subcarriers occupied by the uplink control information and that correspond to odd resource indexes of the physical uplink control channel are odd numbers (1, 3, 5, 7, 9, 11), indexes that are of the frequency domain subcarriers occupied by the DMRS and that correspond to the odd resource indexes of the physical uplink control channel are odd numbers (1, 3, 5, 7, 9, 11), indexes that are of the frequency domain subcarriers occupied by the uplink control information and that correspond to even resource indexes of the physical uplink control channel are even numbers (0, 2, 4, 6, 8, 10), and indexes that are of the frequency domain subcarriers occupied by the DMRS and that correspond to the even PUCCH indexes are even numbers (0, 2, 4, 6, 8, 10).

2. Orthogonal Code Determining Manner

In the orthogonal code determining manner, the terminal device determines the some frequency domain subcarriers based on a correspondence between the some frequency domain subcarriers and the orthogonal code corresponding to the uplink control information, and the orthogonal code. It can be learned that the orthogonal code corresponding to the uplink control information is required in the orthogonal code determining manner. For example, the terminal device may determine, based on a correspondence between the resource index of the physical uplink control channel and the orthogonal code corresponding to the uplink control information, and the resource index of the physical uplink control channel, the orthogonal code corresponding to the uplink control information.

Specifically, the terminal device may determine, based on an explicit or implicit indication in the dynamic signaling in S62, the resource index of the physical uplink control channel used by the terminal device to transmit the uplink control information, and determine, based on the resource index of the physical uplink control channel, the orthogonal code corresponding to the uplink control information. The protocol may predefine the correspondence between the some frequency domain subcarriers and the orthogonal code corresponding to the uplink control information and the correspondence between the resource index of the physical uplink control channel and the orthogonal code corresponding to the uplink control information. Alternatively, these two correspondences may be preset by the network device, or pre-negotiated and determined by the network device and the terminal device. This is not limited in this embodiment of this application. In conclusion, the terminal device may prestore the correspondence between the some frequency domain subcarriers and the orthogonal code corresponding to the uplink control information, and the correspondence between the resource index of the physical uplink control channel and the orthogonal code corresponding to the uplink control information, so that the terminal device can determine the some frequency domain subcarriers occupied by the DMRS.

For example, the correspondence between the some frequency domain subcarriers and the orthogonal code corresponding to the uplink control information includes at least one of the following cases:

if a resource element set includes two combs, when the orthogonal code corresponding to the uplink control information sent through the physical uplink control channel is {+1, +1, +1, +1, +1, +1, +1, +1, +1, +1, +1, +1}, the terminal device may determine that indexes of the some frequency domain subcarriers occupied by the DMRS are {0, 2, 4, 6, 8, 10}; or if a resource element set includes two combs, when the orthogonal code corresponding to the uplink control information sent through the physical uplink control channel is {+1, +1, +1, +1, +1, +1, −1, −1, −1, −1, −1, −1}, the terminal device may determine that indexes of the some frequency domain subcarriers occupied by the DMRS are {1, 3, 5, 7, 9, 11}; or if a resource element set includes three combs, when the orthogonal code corresponding to the uplink control information sent through the physical uplink control channel is {+1, +1, +1, +1, +1, +1, +1, +1, +1, +1, +1, +1}, the terminal device may determine that indexes of the some frequency domain subcarriers occupied by the DMRS are {0, 3, 6, 9}; or if a resource element set includes three combs, when the orthogonal code corresponding to the uplink control information sent through the physical uplink control channel is {+1, +1, +1, +1, exp(j*4*π/3), exp(j*4*π/3), exp(j*4*π/3), exp(j*4*π/3), exp(j*2*π/3), exp(j*2*π/3), exp(j*2*π/3), exp(j*2*π3)}, the terminal device may determine that indexes of the some frequency domain subcarriers occupied by the DMRS are {2, 5, 8, 11}; or if a resource element set includes three combs, when the orthogonal code corresponding to the uplink control information sent through the physical uplink control channel is {+1, +1, +1, +1, exp(j*2*π/3), exp(j*2*π/3), exp(j*2*π/3), exp(j*2*π/3), exp(j*4*π/3), exp(j*4*π/3), exp(j*4*π/3), exp(j*4*π/3)}, the terminal device may determine that indexes of the some frequency domain subcarriers occupied by the DMRS are {1, 4, 7, 10}; or if a resource element set includes four combs, when the orthogonal code corresponding to the uplink control information sent through the physical uplink control channel is {+1, +1, +1, +1, +1, +1, +1, +1, +1, +1, +1, +1}, the terminal device may determine that indexes of the some frequency domain subcarriers occupied by the DMRS are {0, 4, 8}; or if a resource element set includes four combs, when the orthogonal code corresponding to the uplink control information sent through the physical uplink control channel is {+1, +1, +1, +j, +j, +j, −1, −1, −1, −j, −j, −j}, the terminal device may determine that indexes of the some frequency domain subcarriers occupied by the DMRS are {1, 5, 9}; or if a resource element set includes four combs, when the orthogonal code corresponding to the uplink control information sent through the physical uplink control channel is {+1, +1, +1, −1, −1, −1, +1, +1, +1, −1, −1, −1}, the terminal device may determine that indexes of the some frequency domain subcarriers occupied by the DMRS are {2, 6, 10}; or if a resource element set includes four combs, when the orthogonal code corresponding to the uplink control information sent through the physical uplink control channel is {+1, +1, +1, −j, −j, −j, −1, −1, −1, +j, +j, +j}, the terminal device may determine that indexes of the some frequency domain subcarriers occupied by the DMRS are {3, 7, 11}; or if a resource element set includes six combs, when the orthogonal code corresponding to the uplink control information sent through the physical uplink control channel is {+1, +1, +1, +1, +1, +1, +1, +1, +1, +1, +1, +1}, indexes of the some frequency domain subcarriers are {0, 6}; or if a resource element set includes six combs, when the orthogonal code corresponding to the uplink control information sent through the physical uplink control channel is {+1, +1, exp(j*1*π/3), exp(j*1*π/3), exp(j*2*π/3), exp(j*2*tπ3), −1, −1, exp(j*4*π/3), exp(j*4*π/3), exp(j*5*π/3), exp(j*5*π/3)}, the terminal device may determine that indexes of the some frequency domain subcarriers occupied by the DMRS are {1, 7}; or if a resource element set includes six combs, when the orthogonal code corresponding to the uplink control information sent through the physical uplink control channel is {+1, +1, exp(j*2*π/3), exp(j*2*π/3), exp(j*4*π/3), exp(j*4*π/3), +1, +1, exp(j*2*π/3), exp(j*2*n/3), exp(j*4*π/3), exp(j*4*π/3)}, indexes of the some frequency domain subcarriers are {2, 8}; or if a resource element set includes six combs, when the orthogonal code corresponding to the uplink control information sent through the physical uplink control channel is {+1, +1, −1, −1, +1, +1, −1, −1, +1, +1, −1, −1}, the terminal device may determine that indexes of the some frequency domain subcarriers occupied by the DMRS are {3, 9}; or if a resource element set includes six combs, when the orthogonal code corresponding to the uplink control information sent through the physical uplink control channel is {+1, +1, exp(j*4*π/3), exp(j*4*π/3), exp(j*2*π/3), exp(j*2*π/3), +1, +1, exp(j*4*π/3), exp(j*4*π/3), exp(j*2*π/3), exp(j*2*π/3)}, the terminal device may determine that indexes of the some frequency domain subcarriers occupied by the DMRS are {4, 10}; or if a resource element set includes six combs, when the orthogonal code corresponding to the uplink control information sent through the physical uplink control channel is {+1, +1, exp(j*5*π/3), exp(j*5*π/3), exp(j*4*π/3), exp(j*4*π/3), −1, −1, exp(j*2*π/3), exp(j*2*π/3), exp(j*1*π/3), exp(j*1*π/3)}, the terminal device may determine that indexes of the some frequency domain subcarriers occupied by the DMRS are {5, 11}, where exp(n) represents e raised to the power of n, for example, $$\exp(j*4*\pi/3) = e^{j*\frac{4}{3}\pi},$$

and so on. $j=\sqrt{-1}$.

For example, when the PUCCH is sent without frequency hopping, and a resource element set includes two combs, an implementation is as follows: An orthogonal code that is used by the uplink control information and that corresponds to odd resource indexes of the physical uplink control channel is (1, 1, 1, 1, 1, 1, −1, −1, −1, −1, −1, −1), indexes that are of the frequency domain subcarriers occupied by the DMRS and that correspond to the odd resource indexes of the physical uplink control channel are odd numbers (1, 3, 5, 7, 9, 11), the orthogonal code that is used by the uplink control information and that corresponds to even resource indexes of the physical uplink control channel is (1, 1, 1, 1, 1, 1, 1, 1, 1, 1, 1, 1), and indexes that are of the frequency domain subcarriers occupied by the DMRS and that correspond to the even resource indexes of the physical uplink control channel are even numbers (0, 2, 4, 6, 8, 10).

3. Physical Uplink Control Channel Determining Manner

In the physical uplink control channel determining manner, the terminal device may determine, based on the resource index of the physical uplink control channel, the some frequency domain subcarriers occupied by the DMRS. The resource index of the physical uplink control channel is a virtual PUCCH resource index, and there is a mapping relationship between the resource index of the physical uplink control channel and a physical resource occupied by the PUCCH. For example, when the PUCCH is sent without frequency hopping, the physical resource occupied by the physical uplink control channel is PRBs {1, 2, 3, 4, 97, 98, 99, 100}, and each physical uplink control channel can use only one PRB, virtual PUCCH resource indexes (namely, the resource index of the physical uplink control channel) are {1, 2, 3, 4, 5, 6, 7, 8}, and there are one-to-one mapping relationships between eight resource indexes and eight PRBs. For example, the index 1 corresponds to the PRB 1, and so on.

For example, that the terminal device determines the some frequency domain subcarriers based on the resource index of the physical uplink control channel may be implemented in the following manner: The terminal device determines the some frequency domain subcarriers based on the correspondence between the resource index of the physical uplink control channel and the some frequency domain subcarriers, and the resource index of the physical uplink control channel.

Specifically, the terminal device may determine, based on an explicit or implicit indication in the dynamic signaling in S62, the resource index of the physical uplink control channel used by the terminal device to transmit the uplink control information. The protocol may predefine the correspondence between the resource index of the physical uplink control channel and the some frequency domain subcarriers. Alternatively, the correspondence between the resource index of the physical uplink control channel and the some frequency domain subcarriers may be preset by the network device, or pre-negotiated and determined by the network device and the terminal device. This is not limited in this embodiment of this application. In conclusion, the terminal device may prestore the correspondence between the resource index of the physical uplink control channel and the some frequency domain subcarriers. Because the terminal device further knows the resource index of the physical uplink control channel, the terminal device can determine the some frequency domain subcarriers occupied by the DMRS. This manner is relatively simple and direct.

For example, when a resource element set includes two combs, an implementation is as follows: The indexes that are of the frequency domain subcarriers occupied by the DMRS and that correspond to the odd resource indexes of the physical uplink control channel are odd numbers (1, 3, 5, 7, 9, 11), and the indexes that are of the frequency domain subcarriers occupied by the DMRS and that correspond to the even resource indexes of the physical uplink control channel are even numbers (0, 2, 4, 6, 8, 10). Alternatively, another implementation is as follows: The indexes that are of the frequency domain subcarriers occupied by the DMRS and that correspond to the even resource indexes of the physical uplink control channel are odd numbers (1, 3, 5, 7, 9, 11), and the indexes that are of the frequency domain subcarriers occupied by the DMRS and that correspond to the odd resource indexes of the physical uplink control channel are even numbers (0, 2, 4, 6, 8, 10).

Alternatively, for example, when a resource element set includes three combs, an implementation is as follows: When a result of mod 3 performed on the resource index of the physical uplink control channel is 0, the indexes of the frequency domain subcarriers occupied by the DMRS are odd numbers (0, 3, 6, 9); or when a result of mod 3 performed on the resource index of the physical uplink control channel is 1, the indexes of the frequency domain subcarriers occupied by the DMRS are odd numbers (1, 4, 7, 10); or when a result of mod 3 performed on the resource index of the physical uplink control channel is 2, the indexes of the frequency domain subcarriers occupied by the DMRS are even numbers (2, 5, 8, 11); or the like, where mod represents a modulo operation.

Regardless of whether the some frequency domain subcarriers occupied by the DMRS are determined by using the frequency domain subcarriers occupied by the uplink control information, by using the orthogonal code, or by using the resource index of the physical uplink control channel, a comb for sending the DMRS is kept consistent with a comb for sending the uplink control information. In other words, an objective is to make the DMRS occupy the same frequency domain subcarriers in the resource element set as the uplink control information, so that frequency-domain orthogonalization between a DMRS sent by a terminal device in the resource element set and uplink control information sent by another terminal device in the resource element set can be implemented, thereby reducing a conflict.

4. Signaling Determining Manner

For example, the network device may send the higher layer signaling or dynamic signaling to the terminal device, where the higher layer signaling or the dynamic signaling is used to indicate the some frequency domain subcarriers occupied by the DMRS, for example, indicate the indexes of the some frequency domain subcarriers. After receiving the higher layer signaling or the dynamic signaling sent by the network device, the terminal device may determine the some frequency domain subcarriers occupied by the DMRS sent through the physical uplink control channel.

The higher layer signaling is, for example, the RRC signaling; and the dynamic signaling may be signaling carried on the physical downlink control channel, for example, the DCI.

In this manner, indexes of REs occupied by the DMRS are semi-statically indicated by the network device. The signaling has a validation period, thereby reducing overheads of the signaling.

In the foregoing four determining manners, the direct determining manner, the physical uplink control channel determining manner, and the signaling determining manner may be all considered as determining manners based on the foregoing subcarrier principle, and the orthogonal code determining manner may be considered as a determining manner based on the foregoing orthogonal code principle. Alternatively, because essence of the subcarrier principle and that of the orthogonal code principle are both to make the some frequency domain subcarriers the same as the frequency domain subcarriers occupied by the uplink control information, it may be considered that all the foregoing four determining manners: the direct determining manner, the orthogonal code determining manner, the physical uplink control channel determining manner, and the signaling determining manner are determining manners based on the foregoing subcarrier principle.

The following describes a method for generating the physical uplink control channel by the terminal device, that is, a method for generating, by the terminal device, the uplink control information carried on the physical uplink control channel and a method for generating, by the terminal device, the demodulation reference signal carried on the physical uplink control channel. The following describes the two methods respectively.

A. Uplink Control Information

The terminal device generates encoded bits through channel coding based on a quantity of bits of to-be-transmitted uplink control information and a quantity of encoded bits that can be carried on the physical uplink control channel. For example, if the to-be-transmitted uplink control information includes 20 bits, and the quantity of encoded bits that can be carried on the physical uplink control channel is 120 bits, the terminal device encodes 20-bit information into 120-bit information by using a polar code (polar code) encoding manner.

The terminal device divides the generated encoded bit information into groups, where each group of encoded bit information corresponds to one time domain symbol, and the terminal device performs DFT transform on each group of encoded bit information, and then maps transformed information onto a frequency domain subcarrier.

For example, when there are two combs, a quantity of encoded bits are 120 bits, and the uplink control information occupies 10 time domain symbols, each time domain symbol carries 12 encoded bits, namely, six quadrature phase shift keying (quadrature phase shift keying, QPSK) symbols (a0, a1, a2, a3, a4, a5). The terminal device scrambles an OCC (1, 1, 1, 1, 1, 1, 1, 1, 1, 1, 1, 1) onto the six QPSK symbols, to generate 12 scrambled QPSK symbols (a0, a1, a2, a3, a4, a5, a0, a1, a2, a3, a4, a5); performs 12-point DFT transform on the (a0, a1, a2, a3, a4, a5, a0, a1, a2, a3, a4, a5), to generate to-be-transmitted uplink control information (a0', 0, a1', 0, a2', 0, a3', 0, a4', 0, a5', 0); and maps the to-be-transmitted uplink control information (a0', 0, a1', 0, a2', 0, a3', 0, a4', 0, a5', 0) consecutively onto 12 subcarriers of the resource element set.

Alternatively, when there are two combs, the quantity of encoded bits are 120 bits, and the uplink control information occupies 10 time domain symbols, 12 encoded bits are carried on each time domain symbol, namely, six QPSK symbols (a0, a1, a2, a3, a4, a5). The terminal device performs six-point DFT transform on the (a0, a1, a2, a3, a4, a5), to generate to-be-transmitted uplink control information (a0", a1", a2", a3", a4", a5"), and the terminal device maps the to-be-transmitted uplink control information (a0", a1", a2", a3", a4", a5"), at a same spacing, onto odd frequency domain subcarriers or even frequency domain subcarriers of the resource element set.

B. Demodulation Reference Signal

For example, when there are two combs, a length of a DMRS sequence is 6, and the terminal device directly maps the DMRS sequence whose length is 6 onto the some frequency domain subcarriers corresponding to the DMRS, where the some frequency domain subcarriers are determined by using the method described above. For example, the indexes of the some frequency domain subcarriers are {0, 2, 4, 6, 8, 10}.

S64. The terminal device sends the physical uplink control channel, and the network device receives the physical uplink control channel. The network device obtains the demodulation reference signal and the uplink control information from the physical uplink control channel.

After generating the physical uplink control channel, the terminal device can send the physical uplink control channel. The network device may determine the some frequency domain subcarriers occupied by the DMRS of the physical uplink control channel in a manner the same as that used by the terminal device, so that after receiving the physical uplink control channel, the network device can obtain the DMRS based on the some frequency domain subcarriers. Because the manner of determining the some frequency domain subcarriers by the network device may be the same as that used by the terminal device, details are not described herein again.

Figures 7C, 8:
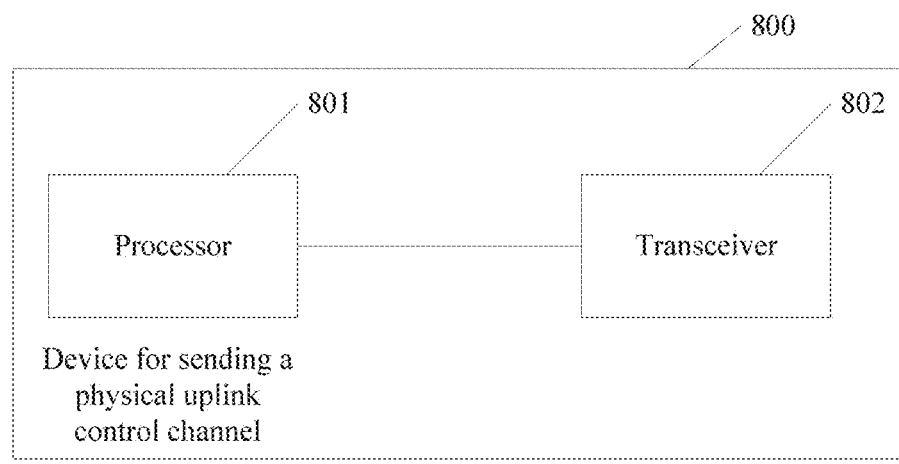
FIG. 7C is a schematic diagram of sending UCI and DMRSs by two terminal devices during multiplexing in a same resource element set according to an embodiment of this application.
FIG. 8 is a schematic structural diagram of a device for sending a physical uplink control channel according to an embodiment of this application.

FIG. 7C is a schematic diagram of performing, by two terminal devices, multiplexing in one resource element set after the technical solutions provided in this embodiment of this application are used. A terminal device a uses a 7-symbol long PUCCH, and a0', a1', a2', a3', a4', and a5' in FIG. 7C represent uplink control information sent by the terminal device a. A terminal device b uses a 5-symbol long PUCCH, and b0', b1', b2', b3', b4', and b5' in FIG. 7C represent uplink control information sent by the terminal device b. A DMRS (a) represents a DMRS sent by the terminal device a, and a DMRS (b) represents a DMRS sent by the terminal device b. It can be learned that DMRSs and uplink control information of long PUCCHs of different lengths can be multiplexed on a same OFDM/DFT-s-OFDM symbol, and when the DMRSs and the uplink control information of the long PUCCHs of different lengths are multiplexed on the same OFDM/DFT-s-OFDM symbol, the DMRSs and the UCI occupy different frequency domain resources, so as to ensure that when DMRS symbols of long PUCCHs of different lengths are unaligned, flexible multiplexing may also be implemented, and ensure that a long PUCCH can include a sufficient quantity of DMRSs.

In this embodiment of this application, when a plurality of long PUCCHs of different lengths are multiplexed in one resource element set, positions of DMRSs may be flexibly designed based on lengths of the long PUCCHs, so as to ensure channel estimation performance.

The following describes apparatuses provided in the embodiments of this application with reference to the accompanying drawings.

FIG. 8 is a schematic structural diagram of a device 800 for sending a physical uplink control channel. The device 800 for sending a physical uplink control channel can implement functions of the terminal device in the foregoing specification. The device 800 for sending a physical uplink control channel may be the terminal device in the foregoing specification, or may be a chip disposed in the terminal device in the foregoing specification. The device 800 for sending a physical uplink control channel may include a processor 801 and a transceiver 802. The processor 801 may be configured to perform S61 and S63 in the embodiment shown in FIG. 6, and/or support other processes of the technologies described in this specification. The transceiver 802 may be configured to perform S62 and S64 in the embodiment shown in FIG. 6, and/or support other processes of the technologies described in this specification.

For example, the processor 801 is configured to generate a physical uplink control channel, where the physical uplink control channel carries a demodulation reference signal and uplink control information, the physical uplink control channel is sent on a resource element set, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of the resource element set on the first time domain symbol, and the some frequency domain subcarriers are the same as frequency domain subcarriers that are occupied by the uplink control information and that are of the resource element set; and the transceiver 802 is configured to send the physical uplink control channel.

All related content of the steps in the foregoing method embodiment can be used for function descriptions of the corresponding function modules. Details are not described again.

Figure 9:
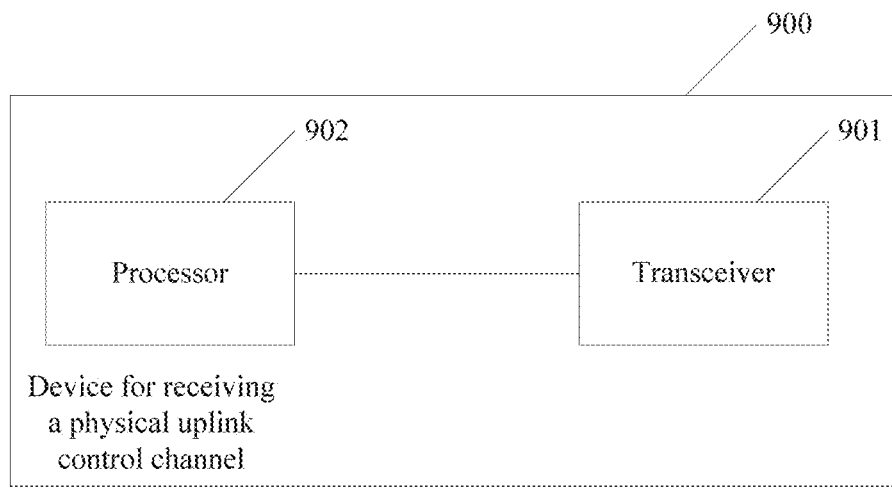
FIG. 9 is a schematic structural diagram of a device for receiving a physical uplink control channel according to an embodiment of this application.

FIG. 9 is a schematic structural diagram of a device 900 for receiving a physical uplink control channel. The device 900 for receiving a physical uplink control channel can implement functions of the network device in the foregoing specification. The device 900 for receiving a physical uplink control channel may be the network device in the foregoing specification, or may be a chip disposed in the network device in the foregoing specification. The device 900 for receiving a physical uplink control channel may include a transceiver 901 and a processor 902. The transceiver 901 may be configured to perform S62 and S64 in the embodiment shown in FIG. 6, and/or support other processes of the technologies described in this specification. The processor 902 may be configured to perform S61 and S64 (that is, obtain the DMRS and the uplink control information from the physical uplink control channel) in the embodiment shown in FIG. 6, and determine the some frequency domain subcarriers occupied by the DMRS, and/or support other processes of the technologies described in this specification.

For example, the transceiver 901 is configured to receive a physical uplink control channel, where the physical uplink control channel carries a demodulation reference signal and uplink control information, the physical uplink control channel is sent on a resource element set, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of the resource element set on the first time domain symbol, and the some frequency domain subcarriers are the same as frequency domain subcarriers that are occupied by the uplink control information and that are of the resource element set; and the processor 902 is configured to obtain the demodulation reference signal and the uplink control information from the physical uplink control channel.

All related content of the steps in the foregoing method embodiment can be used for function descriptions of the corresponding function modules. Details are not described herein again.

Figure 10:
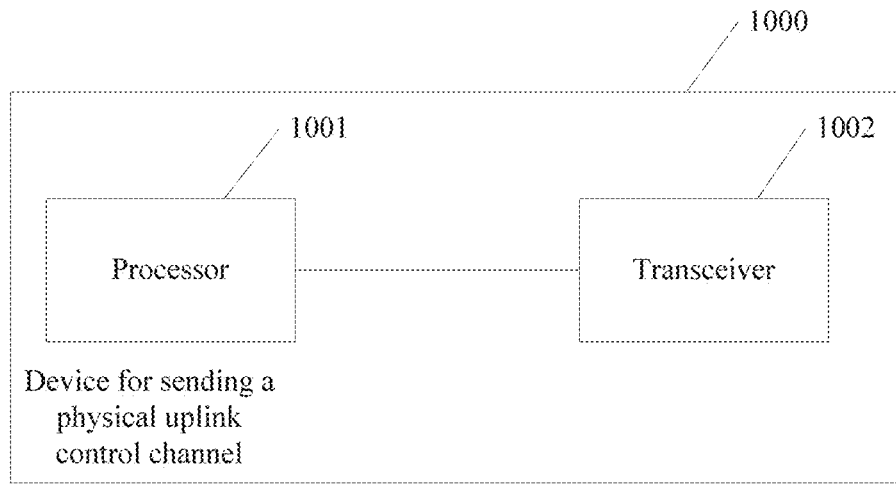
FIG. 10 is a schematic structural diagram of a device for sending a physical uplink control channel according to an embodiment of this application.

FIG. 10 is a schematic structural diagram of a device 1000 for sending a physical uplink control channel. The device 1000 for sending a physical uplink control channel can implement functions of the terminal device in the foregoing specification. The device 1000 for sending a physical uplink control channel may be the terminal device in the foregoing specification, or may be a chip disposed in the terminal device in the foregoing specification. The device 1000 for sending a physical uplink control channel may include a processor 1001 and a transceiver 1002. The processor 1001 may be configured to perform S61 and S63 in the embodiment shown in FIG. 6, and/or support other processes of the technologies described in this specification. The transceiver 1002 may be configured to perform S62 and S64 in the embodiment shown in FIG. 6, and/or support other processes of the technologies described in this specification.

For example, the processor 1001 is configured to generate a physical uplink control channel, where the physical uplink control channel carries a demodulation reference signal and uplink control information, the physical uplink control channel is sent on a resource element set, the resource element set includes a first resource element subset and a second resource element subset, first frequency domain resources included in the first resource element subset are consecutive, second frequency domain resources included in the second resource element subset are consecutive, the first frequency domain resource included in the first resource element subset is the same as or different from the second frequency domain resource included in the second resource element subset, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of a resource element subset on the first time domain symbol, the some frequency domain subcarriers are the same as frequency domain subcarriers that are occupied by the uplink control information and that are of the resource element subset, and the resource element subset is the first resource element subset and/or the second resource element subset; and the transceiver 1002 is configured to send the physical uplink control channel.

All related content of the steps in the foregoing method embodiment can be used for function descriptions of the corresponding function modules. Details are not described herein again.

Figure 11:
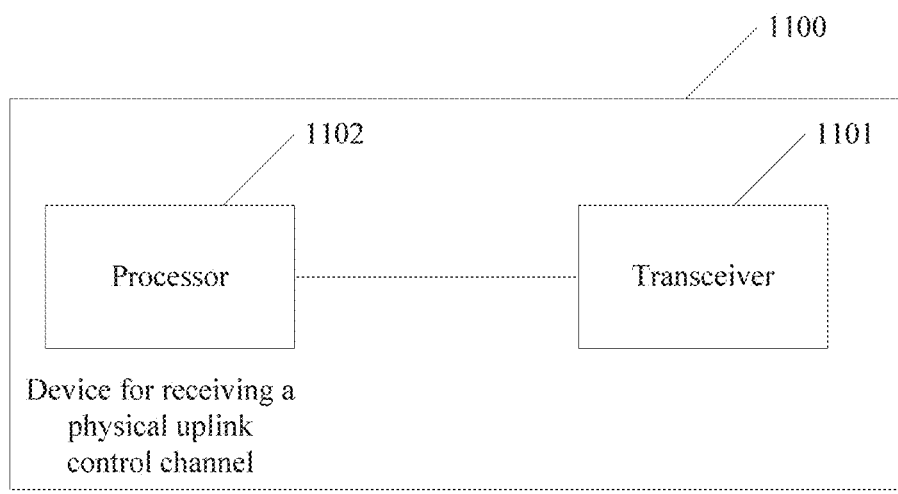
FIG. 11 is a schematic structural diagram of a device for receiving a physical uplink control channel according to an embodiment of this application.

FIG. 11 is a schematic structural diagram of a device 1100 for receiving a physical uplink control channel. The device 1100 for receiving a physical uplink control channel can implement functions of the network device in the foregoing specification. The device 1100 for receiving a physical uplink control channel may be the network device in the foregoing specification, or may be a chip disposed in the network device in the foregoing specification. The device 1100 for receiving a physical uplink control channel may include a transceiver 1101 and a processor 1102. The transceiver 1101 may be configured to perform S62 and S64 in the embodiment shown in FIG. 6, and/or support other processes of the technologies described in this specification. The processor 1102 may be configured to perform S61 and S64 (that is, obtain the DMRS and the uplink control information from the physical uplink control channel) in the embodiment shown in FIG. 6, and determine the some frequency domain subcarriers occupied by the DMRS, and/or support other processes of the technologies described in this specification.

For example, the transceiver 1101 is configured to receive a physical uplink control channel, where the physical uplink control channel carries a demodulation reference signal and uplink control information, the physical uplink control channel is sent on a resource element set, the resource element set includes a first resource element subset and a second resource element subset, first frequency domain resources included in the first resource element subset are consecutive, second frequency domain resources included in the second resource element subset are consecutive, the first frequency domain resource included in the first resource element subset is the same as or different from the second frequency domain resource included in the second resource element subset, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of a resource element subset on the first time domain symbol, the some frequency domain subcarriers are the same as frequency domain subcarriers that are occupied by the uplink control information and that are of the resource element subset, and the resource element subset is the first resource element subset and/or the second resource element subset; and the processor 1102 is configured to obtain the demodulation reference signal and the uplink control information from the physical uplink control channel.

All related content of the steps in the foregoing method embodiment can be used for function descriptions of the corresponding function modules. Details are not described herein again.

Figure 12:
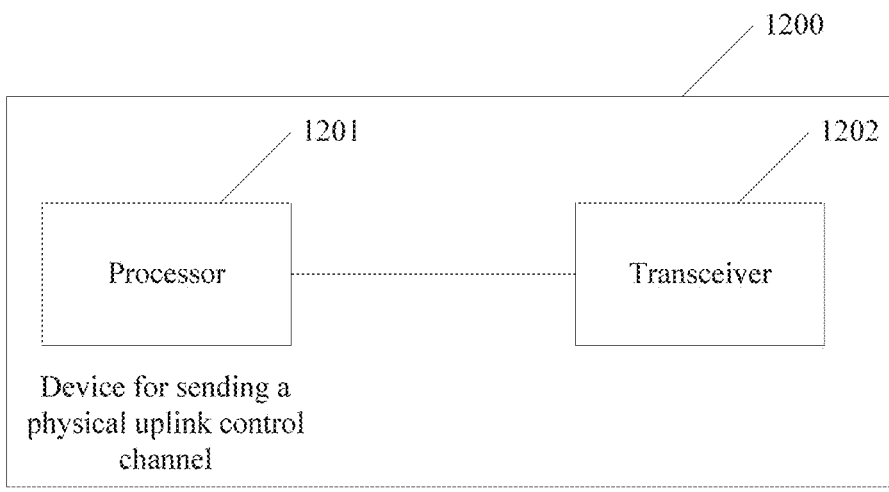
FIG. 12 is a schematic structural diagram of a device for sending a physical uplink control channel according to an embodiment of this application.

FIG. 12 is a schematic structural diagram of a device 1200 for sending a physical uplink control channel. The device 1200 for sending a physical uplink control channel can implement functions of the terminal device in the foregoing specification. The device 1200 for sending a physical uplink control channel may be the terminal device in the foregoing specification, or may be a chip disposed in the terminal device in the foregoing specification. The device 1200 for sending a physical uplink control channel may include a processor 1201 and a transceiver 1202. The processor 1201 may be configured to perform S61 and S63 in the embodiment shown in FIG. 6, and/or support other processes of the technologies described in this specification. The transceiver 1202 may be configured to perform S62 and S64 in the embodiment shown in FIG. 6, and/or support other processes of the technologies described in this specification.

For example, the processor 1201 is configured to generate a physical uplink control channel, where the physical uplink control channel carries a demodulation reference signal and uplink control information, the physical uplink control channel is sent on a resource element set, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of the resource element set on the first time domain symbol, and indexes of the some frequency domain subcarriers are determined based on an orthogonal code corresponding to the uplink control information; and the transceiver 1202 is configured to send the physical uplink control channel.

All related content of the steps in the foregoing method embodiment can be used for function descriptions of the corresponding function modules. Details are not described herein again.

Figure 13:
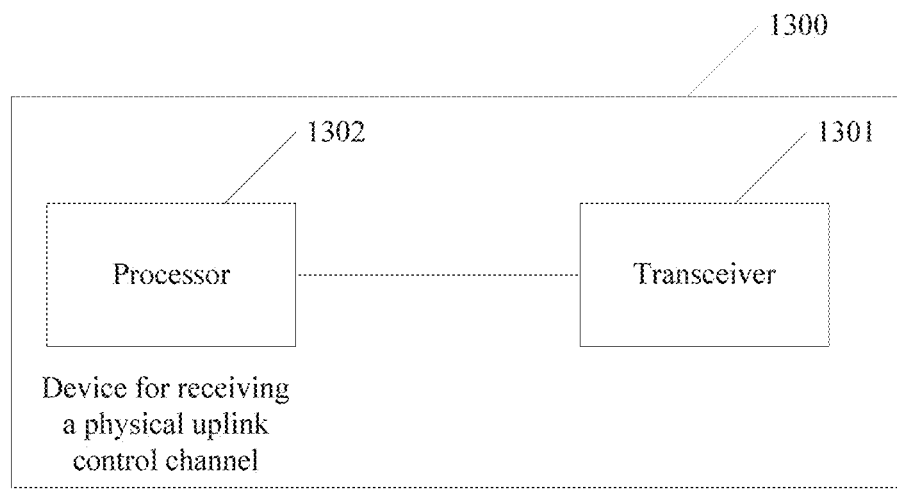
FIG. 13 is a schematic structural diagram of a device for receiving a physical uplink control channel according to an embodiment of this application.

FIG. 13 is a schematic structural diagram of a device 1300 for receiving a physical uplink control channel. The device 1300 for receiving a physical uplink control channel can implement functions of the network device in the foregoing specification. The device 1300 for receiving a physical uplink control channel may be the network device in the foregoing specification, or may be a chip disposed in the network device in the foregoing specification. The device 1300 for receiving a physical uplink control channel may include a transceiver 1301. The transceiver 1301 may be configured to perform S62 and S64 in the embodiment shown in FIG. 6, and/or support other processes of the technologies described in this specification. Optionally, the network device 1300 may further include a processor 1301, and the processor 1301 may be configured to perform S61 and S64 (that is, obtain the DMRS and the uplink control information from the physical uplink control channel) in the embodiment shown in FIG. 6, and determine the some frequency domain subcarriers occupied by the DMRS, and/or support other processes of the technologies described in this specification.

For example, the transceiver 1301 is configured to receive a physical uplink control channel, where the physical uplink control channel carries a demodulation reference signal and uplink control information, the physical uplink control channel is sent on a resource element set, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of the resource element set on the first time domain symbol, and indexes of the some frequency domain subcarriers are determined based on an orthogonal code corresponding to the uplink control information; and the processor 1302 is configured to obtain the demodulation reference signal and the uplink control information from the physical uplink control channel.

All related content of the steps in the foregoing method embodiment can be used for function descriptions of the corresponding function modules. Details are not described herein again.

Figure 14:
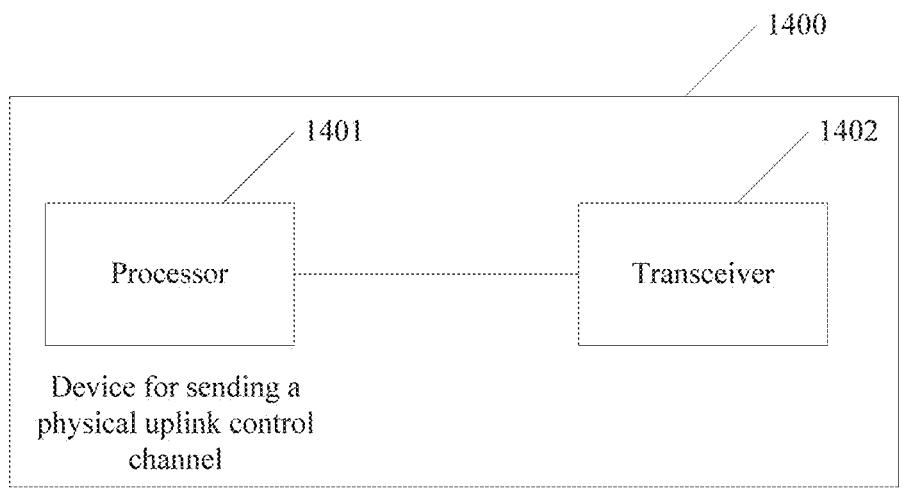
FIG. 14 is a schematic structural diagram of a device for sending a physical uplink control channel according to an embodiment of this application.

FIG. 14 is a schematic structural diagram of a device 1400 for sending a physical uplink control channel. The device 1400 for sending a physical uplink control channel can implement functions of the terminal device in the foregoing specification. The device 1400 for sending a physical uplink control channel may be the terminal device in the foregoing specification, or may be a chip disposed in the terminal device in the foregoing specification. The device 1400 for sending a physical uplink control channel may include a processor 1401 and a transceiver 1402. The processor 1401 may be configured to perform S61 and S63 in the embodiment shown in FIG. 6, and/or support other processes of the technologies described in this specification. The transceiver 1402 may be configured to perform S62 and S64 in the embodiment shown in FIG. 6, and/or support other processes of the technologies described in this specification.

For example, the processor 1401 is configured to generate a physical uplink control channel, where the physical uplink control channel carries a demodulation reference signal and uplink control information, the physical uplink control channel is sent on a resource element set, the resource element set includes a first resource element subset and a second resource element subset, first frequency domain resources included in the first resource element subset are consecutive, second frequency domain resources included in the second resource element subset are consecutive, the first frequency domain resource included in the first resource element subset is the same as or different from the second frequency domain resource included in the second resource element subset, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of a resource element subset on the first time domain symbol, the resource element subset is the first resource element subset and/or the second resource element subset, and indexes of the some frequency domain subcarriers are determined based on an orthogonal code corresponding to the uplink control information; and the transceiver 1402 is configured to send the physical uplink control channel.

All related content of the steps in the foregoing method embodiment can be used for function descriptions of the corresponding function modules. Details are not described herein again.

Figure 15:
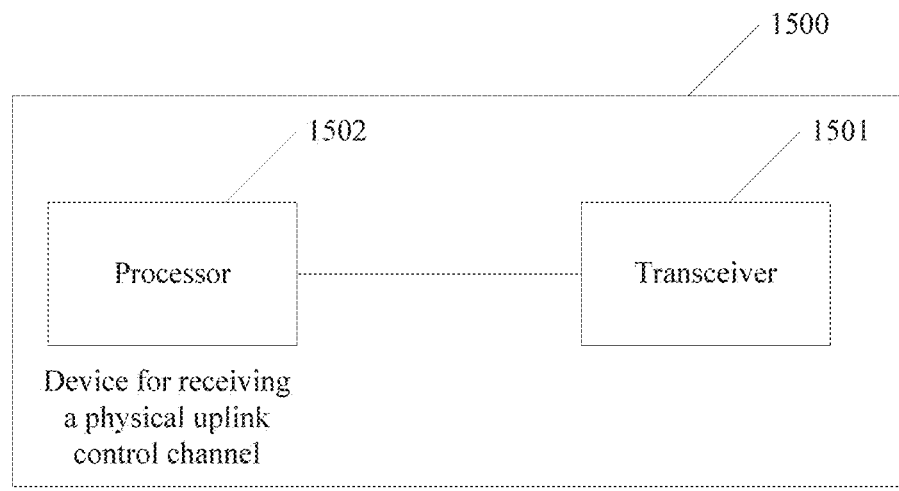
FIG. 15 is a schematic structural diagram of a device for receiving a physical uplink control channel according to an embodiment of this application.

FIG. 15 is a schematic structural diagram of a device 1500 for receiving a physical uplink control channel. The device 1500 for receiving a physical uplink control channel can implement functions of the network device in the foregoing specification. The device 1500 for receiving a physical uplink control channel may be the network device in the foregoing specification, or may be a chip disposed in the network device in the foregoing specification. The device 1500 for receiving a physical uplink control channel may include a transceiver 1501 and a processor 1502. The transceiver 1501 may be configured to perform S62 and S64 in the embodiment shown in FIG. 6, and/or support other processes of the technologies described in this specification. The processor 1502 may be configured to perform S61 and S64 (that is, obtain the DMRS and the uplink control information from the physical uplink control channel) in the embodiment shown in FIG. 6, and determine the some frequency domain subcarriers occupied by the DMRS, and/or support other processes of the technologies described in this specification.

For example, the transceiver 1501 is configured to receive a physical uplink control channel, where the physical uplink control channel carries a demodulation reference signal and uplink control information, the physical uplink control channel is sent on a resource element set, the resource element set includes a first resource element subset and a second resource element subset, first frequency domain resources included in the first resource element subset are consecutive, second frequency domain resources included in the second resource element subset are consecutive, the first frequency domain resource included in the first resource element subset is the same as or different from the second frequency domain resource included in the second resource element subset, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of a resource element subset on the first time domain symbol, the resource element subset is the first resource element subset and/or the second resource element subset, and indexes of the some frequency domain subcarriers are determined based on an orthogonal code corresponding to the uplink control information; and the processor 1502 is configured to obtain the demodulation reference signal and the uplink control information from the physical uplink control channel.

All related content of the steps in the foregoing method embodiment can be used for function descriptions of the corresponding function modules. Details are not described herein again.

Figure 16A:
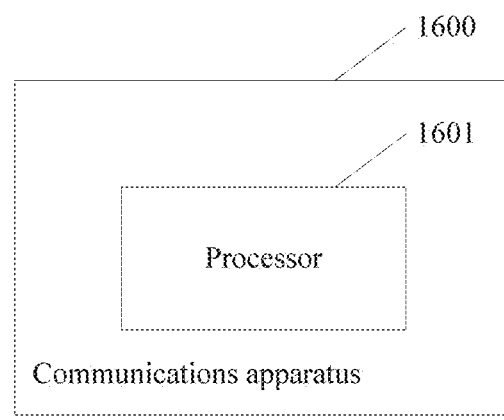
FIG. 16A and FIG. 16B are schematic structural diagrams of a communications apparatus according to an embodiment of this application.

In a simple embodiment, persons skilled in the art may figure out that the device 800 for sending a physical uplink control channel, the device 900 for receiving a physical uplink control channel, the device 1000 for sending a physical uplink control channel, the device 1100 for receiving a physical uplink control channel, the device 1200 for sending a physical uplink control channel, the device 1300 for receiving a physical uplink control channel, the device 1400 for sending a physical uplink control channel, and the device 1500 for receiving a physical uplink control channel may further be implemented in a structure of a communications apparatus 1600 shown in FIG. 16A. The communications apparatus 1600 may implement functions of the network device or the terminal device in the foregoing specification. The communications apparatus 1600 may include a processor 1601. When the communications apparatus 1600 is configured to implement the functions of the network device in the embodiment shown in FIG. 6, the processor 1601 may be configured to perform S61 in the embodiment shown in FIG. 6, and determine the some frequency domain subcarriers occupied by the DMRS, and/or support other processes of the technologies described in this specification. When the communications apparatus 1600 is configured to implement the functions of the terminal device in the embodiment shown in FIG. 6, the processor 1601 may be configured to perform S61 and S63 in the embodiment shown in FIG. 6, and/or support other processes of the technologies described in this specification.

The communications apparatus 1600 may be implemented by using a field programmable gate array (FPGA), an application specific integrated chip (ASIC), a system on chip (SoC), a central processing unit (CPU), a network processor (NP), a digital signal processor (DSP), or a microcontroller (MCU), and may alternatively be implemented by using a programmable controller (PLD) or another integrated chip. The communications apparatus 1200 may be arranged in the network device or the terminal device in the embodiments of this application, so that the network device implements the method for receiving a physical uplink control channel according to the embodiments of this application, or the terminal device implements the method for sending a physical uplink control channel according to the embodiments of this application.

Figure 16B:
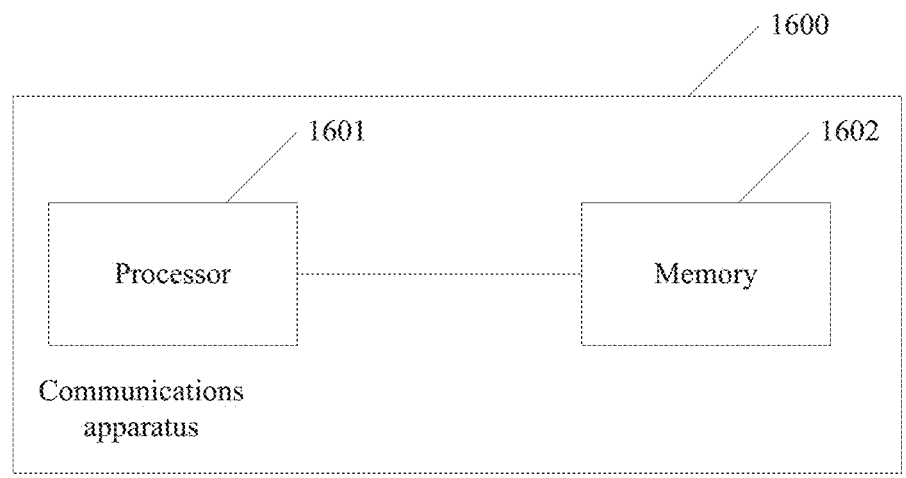

In an optional implementation, the communications apparatus 1600 may further include a memory 1602. Referring to FIG. 16B, the memory 1602 is configured to store a computer program or an instruction, and the processor 1601 is configured to decode and execute the computer program or the instruction. It should be understood that the computer program or the instruction may include a function program of the network device or the terminal device. When the function program of the network device is decoded and executed by the processor 1601, the network device can implement the functions of the network device in the method for receiving a physical uplink control channel according to the embodiments of this application. When the function program of the terminal device is decoded and executed by the processor 1601, the terminal device can implement the functions of the terminal device in the method for sending a physical uplink control channel according to the embodiments of this application.

In another optional implementation, the function program of the network device or the terminal device is stored in a memory outside the communications apparatus 1600. When the function program of the network device is decoded and executed by the processor 1601, the memory 1602 temporarily stores a part or all content of the function program of the network device. When the function program of the terminal device is decoded and executed by the processor 1601, the memory 1602 temporarily stores a part or all content of the function program of the terminal device.

In still another optional implementation, the function program of the network device or the terminal device is stored in the memory 1602 disposed inside the communications apparatus 1600. When the memory 1602 inside the communications apparatus 1600 stores the function program of the network device, the communications apparatus 1600 may be disposed in the network device in the embodiments of this application. When the memory 1602 inside the communications apparatus 1600 stores the function program of the terminal device, the communications apparatus 1600 may be disposed in the terminal device in the embodiments of this application.

In yet another optional implementation, a part of content of the function program of the network device is stored in a memory outside the communications apparatus 1600, and a remaining part of the content of the function program of the network device is stored in the memory 1602 inside the communications apparatus 1600. Alternatively, a part of content of the function program of the terminal device is stored in a memory outside the communications apparatus 1600, and a remaining part of the content of the function program of the terminal device is stored in the memory 1602 inside the communications apparatus 1600.

In the embodiments of this application, the device 800 for sending a physical uplink control channel, the device 900 for receiving a physical uplink control channel, the device 1000 for sending a physical uplink control channel, the device 1100 for receiving a physical uplink control channel, the device 1200 for sending a physical uplink control channel, the device 1300 for receiving a physical uplink control channel, the device 1400 for sending a physical uplink control channel, the device 1500 for receiving a physical uplink control channel, and the communications apparatus 1600 may be presented in a form of dividing the function modules according to the functions, or presented in a form of dividing the function modules in an integrated manner. "Modules" herein may be the ASIC, a processor and a memory that execute one or more software or firmware programs, an integrated logic circuit, and/or another device capable of providing the foregoing functions.

In addition, the device 800 for sending a physical uplink control channel provided in the embodiment shown in FIG. 8 may further be implemented in another form. For example, the device for sending a physical uplink control channel includes a processing module and a transceiver module. For example, the processing module may be implemented by the processor 801, and the transceiver module may be implemented by the transceiver 802. The processing module may be configured to perform S61 and S63 in the embodiment shown in FIG. 6, and/or support other processes of the technologies described in this specification. The transceiver module may be configured to perform S62 and S64 in the embodiment shown in FIG. 6, and/or support other processes of the technologies described in this specification.

For example, the processing module is configured to generate a physical uplink control channel, where the physical uplink control channel carries a demodulation reference signal and uplink control information, the physical uplink control channel is sent on a resource element set, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of the resource element set on the first time domain symbol, and the some frequency domain subcarriers are the same as frequency domain subcarriers that are occupied by the uplink control information and that are of the resource element set; and the transceiver module is configured to send the physical uplink control channel.

All related content of the steps in the foregoing method embodiment can be used for function descriptions of the corresponding function modules. Details are not described herein again.

In addition, the device 900 for receiving a physical uplink control channel provided in the embodiment shown in FIG. 9 may further be implemented in another form. For example, the device for receiving a physical uplink control channel includes a transceiver module and a processing module. For example, the processing module may be implemented by the processor 902, and the transceiver module may be implemented by the transceiver 901. The transceiver module may be configured to perform S62 and S64 in the embodiment shown in FIG. 6, and/or support other processes of the technologies described in this specification. The processing module may be configured to perform S61 and S64 (that is, obtain the DMRS and the uplink control information from the physical uplink control channel) in the embodiment shown in FIG. 6, and determine the some frequency domain subcarriers occupied by the DMRS, and/or support other processes of the technologies described in this specification.

For example, the transceiver module is configured to receive a physical uplink control channel, where the physical uplink control channel carries a demodulation reference signal and uplink control information, the physical uplink control channel is sent on a resource element set, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of the resource element set on the first time domain symbol, and the some frequency domain subcarriers are the same as frequency domain subcarriers that are occupied by the uplink control information and that are of the resource element set; and the processing module is configured to obtain the demodulation reference signal and the uplink control information from the physical uplink control channel.

All related content of the steps in the foregoing method embodiment can be used for function descriptions of the corresponding function modules. Details are not described herein again.

The device 1000 for sending a physical uplink control channel provided in the embodiment shown in FIG. 10 may further be implemented in another form. For example, the device for sending a physical uplink control channel includes a processing module and a transceiver module. For example, the processing module may be implemented by the processor 1001, and the transceiver module may be implemented by the transceiver 1002. The processing module may be configured to perform S61 and S63 in the embodiment shown in FIG. 6, and/or support other processes of the technologies described in this specification. The transceiver module may be configured to perform S62 and S64 in the embodiment shown in FIG. 6, and/or support other processes of the technologies described in this specification.

For example, the processing module is configured to generate a physical uplink control channel, where the physical uplink control channel carries a demodulation reference signal and uplink control information, the physical uplink control channel is sent on a resource element set, the resource element set includes a first resource element subset and a second resource element subset, first frequency domain resources included in the first resource element subset are consecutive, second frequency domain resources included in the second resource element subset are consecutive, the first frequency domain resource included in the first resource element subset is the same as or different from the second frequency domain resource included in the second resource element subset, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of a resource element subset on the first time domain symbol, the some frequency domain subcarriers are the same as frequency domain subcarriers that are occupied by the uplink control information and that are of the resource element subset, and the resource element subset is the first resource element subset and/or the second resource element subset; and the transceiver module is configured to send the physical uplink control channel.

All related content of the steps in the foregoing method embodiment can be used for function descriptions of the corresponding function modules. Details are not described herein again.

The device 1100 for receiving a physical uplink control channel provided in the embodiment shown in FIG. 11 may further be implemented in another form. For example, the device for receiving a physical uplink control channel includes a transceiver module and a processing module. For example, the processing module may be implemented by the processor 1102, and the transceiver module may be implemented by the transceiver 1101. The transceiver module may be configured to perform S62 and S64 in the embodiment shown in FIG. 6, and/or support other processes of the technologies described in this specification. The processing module may be configured to perform S61 and S64 (that is, obtain the DMRS and the uplink control information from the physical uplink control channel) in the embodiment shown in FIG. 6, and determine the some frequency domain subcarriers occupied by the DMRS, and/or support other processes of the technologies described in this specification.

For example, the transceiver module is configured to receive a physical uplink control channel, where the physical uplink control channel carries a demodulation reference signal and uplink control information, the physical uplink control channel is sent on a resource element set, the resource element set includes a first resource element subset and a second resource element subset, first frequency domain resources included in the first resource element subset are consecutive, second frequency domain resources included in the second resource element subset are consecutive, the first frequency domain resource included in the first resource element subset is the same as or different from the second frequency domain resource included in the second resource element subset, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of a resource element subset on the first time domain symbol, the some frequency domain subcarriers are the same as frequency domain subcarriers that are occupied by the uplink control information and that are of the resource element subset, and the resource element subset is the first resource element subset and/or the second resource element subset; and the processing module is configured to obtain the demodulation reference signal and the uplink control information from the physical uplink control channel.

All related content of the steps in the foregoing method embodiment can be used for function descriptions of the corresponding function modules. Details are not described herein again.

The device 1200 for sending a physical uplink control channel provided in the embodiment shown in FIG. 12 may further be implemented in another form. For example, the device for sending a physical uplink control channel includes a processing module and a transceiver module. For example, the processing module may be implemented by the processor 1201, and the transceiver module may be implemented by the transceiver 1202. The processing module may be configured to perform S61 and S63 in the embodiment shown in FIG. 6, and/or support other processes of the technologies described in this specification. The transceiver module may be configured to perform S62 and S64 in the embodiment shown in FIG. 6, and/or support other processes of the technologies described in this specification.

For example, the processing module is configured to generate a physical uplink control channel, where the physical uplink control channel carries a demodulation reference signal and uplink control information, the physical uplink control channel is sent on a resource element set, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of the resource element set on the first time domain symbol, and indexes of the some frequency domain subcarriers are determined based on an orthogonal code corresponding to the uplink control information; and the transceiver module is configured to send the physical uplink control channel.

All related content of the steps in the foregoing method embodiment can be used for function descriptions of the corresponding function modules. Details are not described herein again.

The device 1300 for receiving a physical uplink control channel provided in the embodiment shown in FIG. 13 may further be implemented in another form. For example, the device for receiving a physical uplink control channel includes a transceiver module and a processing module. For example, the processing module may be implemented by the processor 1302, and the transceiver module may be implemented by the transceiver 1301. The transceiver module may be configured to perform S62 and S64 in the embodiment shown in FIG. 6, and/or support other processes of the technologies described in this specification. The processing module may be configured to perform S61 and S64 (that is, obtain the DMRS and the uplink control information from the physical uplink control channel) in the embodiment shown in FIG. 6, and determine the some frequency domain subcarriers occupied by the DMRS, and/or support other processes of the technologies described in this specification.

For example, the transceiver module is configured to receive a physical uplink control channel, where the physical uplink control channel carries a demodulation reference signal and uplink control information, the physical uplink control channel is sent on a resource element set, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of the resource element set on the first time domain symbol, and indexes of the some frequency domain subcarriers are determined based on an orthogonal code corresponding to the uplink control information; and the processing module is configured to obtain the demodulation reference signal and the uplink control information from the physical uplink control channel.

All related content of the steps in the foregoing method embodiment can be used for function descriptions of the corresponding function modules. Details are not described herein again.

The device 1400 for sending a physical uplink control channel provided in the embodiment shown in FIG. 14 may further be implemented in another form. For example, the device for sending a physical uplink control channel includes a processing module and a transceiver module. For example, the processing module may be implemented by the processor 1401, and the transceiver module may be implemented by the transceiver 1402. The processing module may be configured to perform S61 and S63 in the embodiment shown in FIG. 6, and/or support other processes of the technologies described in this specification. The transceiver module may be configured to perform S62 and S64 in the embodiment shown in FIG. 6, and/or support other processes of the technologies described in this specification.

For example, the processing module is configured to generate a physical uplink control channel, where the physical uplink control channel carries a demodulation reference signal and uplink control information, the physical uplink control channel is sent on a resource element set, the resource element set includes a first resource element subset and a second resource element subset, first frequency domain resources included in the first resource element subset are consecutive, second frequency domain resources included in the second resource element subset are consecutive, the first frequency domain resource included in the first resource element subset is the same as or different from the second frequency domain resource included in the second resource element subset, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of a resource element subset on the first time domain symbol, the resource element subset is the first resource element subset and/or the second resource element subset, and indexes of the some frequency domain subcarriers are determined based on an orthogonal code corresponding to the uplink control information; and the transceiver module is configured to send the physical uplink control channel.

All related content of the steps in the foregoing method embodiment can be used for function descriptions of the corresponding function modules. Details are not described herein again.

The device 1500 for receiving a physical uplink control channel provided in the embodiment shown in FIG. 15 may further be implemented in another form. For example, the device for receiving a physical uplink control channel includes a transceiver module and a processing module. For example, the processing module may be implemented by the processor 1502, and the transceiver module may be implemented by the transceiver 1501. The transceiver module may be configured to perform S62 and S64 in the embodiment shown in FIG. 6, and/or support other processes of the technologies described in this specification. The processing module may be configured to perform S61 and S64 (that is, obtain the DMRS and the uplink control information from the physical uplink control channel) in the embodiment shown in FIG. 6, and determine the some frequency domain subcarriers occupied by the DMRS, and/or support other processes of the technologies described in this specification.

For example, the transceiver module is configured to receive a physical uplink control channel, where the physical uplink control channel carries a demodulation reference signal and uplink control information, the physical uplink control channel is sent on a resource element set, the resource element set includes a first resource element subset and a second resource element subset, first frequency domain resources included in the first resource element subset are consecutive, second frequency domain resources included in the second resource element subset are consecutive, the first frequency domain resource included in the first resource element subset is the same as or different from the second frequency domain resource included in the second resource element subset, the resource element set occupies at least two time domain symbols in time domain, the demodulation reference signal is located on at least one time domain symbol of the resource element set, the at least one time domain symbol includes a first time domain symbol, the demodulation reference signal occupies some frequency domain subcarriers of a resource element subset on the first time domain symbol, the resource element subset is the first resource element subset and/or the second resource element subset, and indexes of the some frequency domain subcarriers are determined based on an orthogonal code corresponding to the uplink control information; and the processing module is configured to obtain the demodulation reference signal and the uplink control information from the physical uplink control channel.

All related content of the steps in the foregoing method embodiment can be used for function descriptions of the corresponding function modules. Details are not described herein again.

The device 800 for sending a physical uplink control channel, the device 900 for receiving a physical uplink control channel, the device 1000 for sending a physical uplink control channel, the device 1100 for receiving a physical uplink control channel, the device 1200 for sending a physical uplink control channel, the device 1300 for receiving a physical uplink control channel, the device 1400 for sending a physical uplink control channel, the device 1500 for receiving a physical uplink control channel, and the communications apparatus 1600 according to the embodiments of this application may be configured to perform the method provided in the embodiment shown in FIG. 6. Therefore, for technical effects that can be obtained by the devices and the apparatus, refer to the foregoing method embodiments. Details are not described herein again.

The embodiments of this application are described with reference to the flowcharts and/or block diagrams of the method, the device (system), and the computer program product according to the embodiments of this application. It should be understood that each process and/or each block in the flowcharts and/or the block diagrams and a combination of a process and/or a block in the flowcharts and/or the block diagrams may be implemented by using computer program instructions. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer readable storage medium or may be transmitted from one computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer readable storage medium may be any available medium accessible to a computer, or a data storage device, such as a server or a data center, integrating one or more available media. The available medium may be a magnetic medium (for example, a floppy disk, a hard disk, or a magnetic tape), an optical medium (for example, a digital versatile disc (DVD), a semiconductor medium (for example, a solid-state drive (SSD)), or the like.

Apparently, persons skilled in the art can make various modifications and variations to embodiments of this application without departing from the spirit and scope of this application. This application is intended to cover these modifications and variations provided that they fall within the scope of protection defined by the following claims and their equivalent technologies.

What is claimed is:

1. A method, comprising:
    generating, by a terminal device, a physical uplink control channel, wherein the physical uplink control channel carries a demodulation reference signal and uplink control information, the physical uplink control channel is sent on a resource element set, the resource element set occupies at least two time domain symbols in time domain, the demodulation reference signal is located on at least one time domain symbol of the at least two time domain symbols occupied by the resource element set, the at least one time domain symbol on which the demodulation reference signal is located comprises a first time domain symbol and a second time domain symbol, the demodulation reference signal occupies a first plurality of frequency domain subcarriers of the resource element set on the first time domain symbol, the demodulation reference signal occupies all frequency domain subcarriers of the resource element set on the second time domain symbol, and the first plurality of frequency domain subcarriers are the same as a second plurality of frequency domain subcarriers that are occupied by the uplink control information and that are of the resource element set; and
    sending, by the terminal device, the physical uplink control channel.

2. The method according to claim 1, further comprising:
    determining, based on the second plurality of frequency domain subcarriers occupied by the uplink control information, the first plurality of frequency domain subcarriers occupied by the demodulation reference signal on the first time domain symbol.

3. The method according to claim 2, further comprising:
    before generating the physical uplink control channel, determining, based on a correspondence between a resource index of the physical uplink control channel and the second plurality of frequency domain subcarriers occupied by the uplink control information, and based on the resource index of the physical uplink control channel, the second plurality of frequency domain subcarriers occupied by the uplink control information.

4. The method according to claim 1, further comprising:
    before generating the physical uplink control channel, determining the first plurality of frequency domain subcarriers based on a correspondence between the first plurality of frequency domain subcarriers and an orthogonal code corresponding to the uplink control information, and based on the orthogonal code.

5. The method according to claim 4, further comprising:
    before generating the physical uplink control channel, determining the orthogonal code based on a correspondence between a resource index of the physical uplink control channel and the orthogonal code corresponding to the uplink control information, and based on the resource index of the physical uplink control channel.

6. The method according to claim 5, wherein in the correspondence between the first plurality of frequency domain subcarriers and the orthogonal code corresponding to the uplink control information:
    when the orthogonal code is $\{+1, +1, +1, +1, +1, +1, +1, +1, +1, +1, +1, +1\}$, indexes of the first plurality of frequency domain subcarriers are $\{0, 2, 4, 6, 8, 10\}$; or
    when the orthogonal code used by the uplink control information is $\{+1, +1, +1, +1, +1, +1, -1, -1, -1, -1, -1, -1\}$, indexes of the first plurality of frequency domain subcarriers are $\{1, 3, 5, 7, 9, 11\}$; or
    when the orthogonal code is $\{+1, +1, +1, +1, +1, +1, +1, +1, +1, +1, +1, +1\}$, indexes of the first plurality of frequency domain subcarriers are $\{0, 3, 6, 9\}$; or
    when the orthogonal code is $\{+1, +1, +1, +1, \exp(j*4*\pi/3), \exp(j*4*\pi/3), \exp(j*4*\pi/3), \exp(j*4*\pi/3), \exp(j*2*\pi/3), \exp(j*2*\pi/3), \exp(j*2*\pi/3), \exp(j*2*\pi/3)\}$, indexes of the first plurality of frequency domain subcarriers are $\{2, 5, 8, 11\}$; or
    when the orthogonal code is $\{+1, +1, +1, +1, \exp(j*2*\pi/3), \exp(j*2*\pi/3), \exp(j*2*\pi/3), \exp(j*2*\pi/3), \exp(j*4*\pi/3), \exp(j*4*\pi/3), \exp(j*4*\pi/3), \exp(j*4*\pi/3)\}$, indexes of the first plurality of frequency domain subcarriers are $\{1, 4, 7, 10\}$; or
    when the orthogonal code is $\{+1, +1, +1, +1, +1, +1, +1, +1, +1, +1, +1, +1\}$, indexes of the first plurality of frequency domain subcarriers are $\{0, 4, 8\}$; or
    when the orthogonal code is $\{+1, +1, +1, +j, +j, +j, -1, -1, -1, -j, -j, -j\}$, indexes of the first plurality of frequency domain subcarriers are $\{1, 5, 9\}$; or
    when the orthogonal code is $\{+1, +1, +1, -1, -1, -1, +1, +1, +1, -1, -1, -1\}$, indexes of the first plurality of frequency domain subcarriers are $\{2, 6, 10\}$; or
    when the orthogonal code is $\{+1, +1, +1, -j, -j, -j, -1, -1, -1, +j, +j, +j\}$, indexes of the first plurality of frequency domain subcarriers are $\{3, 7, 11\}$; or when the orthogonal code is {+1, +1, +1, +1, +1, +1, +1, +1, +1, +1, +1, +1}, indexes of the first plurality of frequency domain subcarriers are {0, 6}; or when the orthogonal code is {+1, +1, exp(j*1*π/3), exp(j*1*π/3), exp(j*2*π/3), exp(j*2*π/3), −1, −1, exp(j*4*π/3), exp(j*4*π/3), exp(j*5*π/3), exp(j*5*π/3)}, indexes of the first plurality of frequency domain subcarriers are {1, 7}; or when the orthogonal code is {+1, +1, exp(j*2*π/3), exp(j*2*π/3), exp(j*4*π/3), exp(j*4*π/3), +1, +1, exp(j*2*π/3), exp(j*2*π/3), exp(j*4*π/3), exp(j*4*π/3)}, indexes of the first plurality of frequency domain subcarriers are {2, 8}; or when the orthogonal code is {+1, +1, −1, −1, +1, +1, −1, −1, +1, +1, −1, −1}, indexes of the first plurality of frequency domain subcarriers are {3, 9}; or when the orthogonal code is {+1, +1, exp(j*4*π/3), exp(j*4*π/3), exp(j*2*π/3), exp(j*2*π/3), +1, +1, exp(j*4*π/3), exp(j*4*π/3), exp(j*2*π/3), exp(j*2*π/3)}, indexes of the first plurality of frequency domain subcarriers are {4, 10}; or when the orthogonal code is {+1, +1, exp(j*5*π/3), exp(j*5*π/3), exp(j*4*π/3), exp(j*4*π/3), −1, −1, exp(j*2*π/3), exp(j*2*π/3), exp(j*1*π/3), exp(j*1*π/3)}, indexes of the first plurality of frequency domain subcarriers are {5, 11}, wherein exp(n) represents e raised to the power of n, and j=√−1.

7. The method according to claim 1, further comprising:
before generating the physical uplink control channel, determining the first plurality of frequency domain subcarriers based on a correspondence between a resource index of the physical uplink control channel and the first plurality of frequency domain subcarriers, and the resource index of the physical uplink control channel.

8. The method according to claim 1, further comprising:
before generating the physical uplink control channel, determining the first plurality of frequency domain subcarriers based on an indication of higher layer signaling or dynamic signaling.

9. A device, comprising:
a processor; and
a non-transitory computer-readable storage medium storing a program to be executed by the processor, the program including instructions for:
generating a physical uplink control channel, wherein the physical uplink control channel carries a demodulation reference signal and uplink control information, the physical uplink control channel is sent on a resource element set, the resource element set occupies at least two time domain symbols in time domain, the demodulation reference signal is located on at least one time domain symbol of the at least two time domain symbols occupied by the resource element set, the at least one time domain symbol of the at least two time domain symbols comprises a first time domain symbol and a second time domain symbol, the demodulation reference signal occupies a first plurality of frequency domain subcarriers of the resource element set on the first time domain symbol, the demodulation reference signal occupies all frequency domain subcarriers of the resource element set on the second time domain symbol, and the first plurality of frequency domain subcarriers are the same as a second plurality of frequency domain subcarriers that are occupied by the uplink control information and that are of the resource element set; and
a transceiver, configured to send the physical uplink control channel.

10. The device according to claim 9, wherein the program further includes instructions for:
before generating the physical uplink control channel, determining, based on the second plurality of frequency domain subcarriers occupied by the uplink control information, the first plurality of frequency domain subcarriers occupied by the demodulation reference signal.

11. The device according to claim 10, wherein the program further includes instructions for:
before generating the physical uplink control channel, determining, based on a correspondence between a resource index of the physical uplink control channel and the second plurality of frequency domain subcarriers occupied by the uplink control information, and based on the resource index of the physical uplink control channel, the second plurality of frequency domain subcarriers occupied by the uplink control information.

12. The device according to claim 9, wherein the program further includes instructions for:
before generating the physical uplink control channel, determining the first plurality of frequency domain subcarriers based on a correspondence between the first plurality of frequency domain subcarriers and an orthogonal code corresponding to the uplink control information, and based on the orthogonal code.

13. The device according to claim 12, wherein the program further includes instructions for:
before generating the physical uplink control channel, determining the orthogonal code based on a correspondence between a resource index of the physical uplink control channel and the orthogonal code corresponding to the uplink control information, and the resource index of the physical uplink control channel.

14. The device according to claim 13, wherein in the correspondence between the first plurality of frequency domain subcarriers and the orthogonal code corresponding to the uplink control information:
when the orthogonal code is {+1, +1, +1, +1, +1, +1, +1, +1, +1, +1, +1, +1}, indexes of the first plurality of frequency domain subcarriers are {0, 2, 4, 6, 8, 10}; or when the orthogonal code used by the uplink control information is {+1, +1, +1, +1, +1, +1, −1, −1, −1, −1, −1, −1}, indexes of the first plurality of frequency domain subcarriers are {1, 3, 5, 7, 9, 11}; or when the orthogonal code is {+1, +1, +1, +1, +1, +1, +1, +1, +1, +1, +1, +1}, indexes of the first plurality of frequency domain subcarriers are {0, 3, 6, 9}; or when the orthogonal code is {+1, +1, +1, +1, exp(j*4*π/3), exp(j*4*π/3), exp(j*4*π/3), exp(j*4*π/3), exp(j*2*π/3), exp(j*2*π/3), exp(j*2*π/3), exp(j*2*π/3)}, indexes of the first plurality of frequency domain subcarriers are {2, 5, 8, 11}; or when the orthogonal code is {+1, +1, +1, +1, exp(j*2*π/3), exp(j*2*π/3), exp(j*2*π/3), exp(j*2*π/3), exp(j*4*π/3), exp(j*4*π/3), exp(j*4*π/3), exp(j*4*π/3)}, indexes of the first plurality of frequency domain subcarriers are {1, 4, 7, 10}; or when the orthogonal code is {+1, +1, +1, +1, +1, +1, +1, +1, +1, +1, +1, +1}, indexes of the first plurality of frequency domain subcarriers are {0, 4, 8}; or when the orthogonal code is {+1, +1, +1, +j, +j, +j, −1, −1, −1, −j, −j, −j}, indexes of the first plurality of frequency domain subcarriers are {1, 5, 9}; or when the orthogonal code is {+1, +1, +1, −1, −1, −1, +1, +1, +1, −1, −1, −1}, indexes of the first plurality of frequency domain subcarriers are {2, 6, 10}; or when the orthogonal code is {+1, +1, +1, −j, −j, −j, −1, −1, −1, +j, +j, +j}, indexes of the first plurality of frequency domain subcarriers are {3, 7, 11}; or when the orthogonal code is {+1, +1, +1, +1, +1, +1, +1, +1, +1, +1, +1, +1}, indexes of the first plurality of frequency domain subcarriers are {0, 6}; or when the orthogonal code is {+1, +1, exp(j*1*π/3), exp(j*1*π/3), exp(j*2*π/3), exp(j*2*π/3), −1, −1, exp(j*4*π/3), exp(j*4*π/3), exp(j*5*π/3), exp(j*5*π/3)}, indexes of the first plurality of frequency domain subcarriers are {1, 7}; or when the orthogonal code is {+1, +1, exp(j*2*π/3), exp(j*2*π/3), exp(j*4*π/3), exp(j*4*π/3), +1, +1, exp(j*2*π/3), exp(j*2*π/3), exp(j*4*π/3), exp(j*4*π/3)}, indexes of the first plurality of frequency domain subcarriers are {2, 8}; or when the orthogonal code is {+1, +1, −1, −1, +1, +1, −1, −1, +1, +1, −1, −1}, indexes of the first plurality of frequency domain subcarriers are {3, 9}; or when the orthogonal code is {+1, +1, exp(j*4*π/3), exp(j*4*π/3), exp(j*2*π/3), exp(j*2*π/3), +1, +1, exp(j*4*π/3), exp(j*4*π/3), exp(j*2*π/3), exp(j*2*π/3)}, indexes of the first plurality of frequency domain subcarriers are {4, 10}; or when the orthogonal code is {+1, +1, exp(j*5*π/3), exp(j*5*π/3), exp(j*4*π/3), exp(j*4*π/3), −1, −1, exp(j*2*π/3), exp(j*2*π/3), exp(j*1*π/3), exp(j*1*π/3)}, indexes of the first plurality of frequency domain subcarriers are {5, 11}, wherein exp(n) represents e raised to the power of n, and $j=\sqrt{-1}$.

15. The device according to claim 9, wherein the program further includes instructions for:

before generating the physical uplink control channel, determining the first plurality of frequency domain subcarriers based on a correspondence between a resource index of the physical uplink control channel and the first plurality of frequency domain subcarriers, and based on the resource index of the physical uplink control channel.

16. The device according to claim 9, wherein the program further includes instructions for:

before generating the physical uplink control channel, determining the first plurality of frequency domain subcarriers based on an indication of higher layer signaling or dynamic signaling.

17. A device, comprising:

a transceiver, configured to:
receive a physical uplink control channel sent by a terminal device, wherein the physical uplink control channel carries a demodulation reference signal and uplink control information, the physical uplink control channel is sent on a resource element set, the resource element set occupies at least two time domain symbols in time domain, the demodulation reference signal is located on at least one time domain symbol of the at least two time domain symbols occupied by the resource element set, the at least one time domain symbol of the at least two time domain symbols comprises a first time domain symbol and a second time domain symbol, the demodulation reference signal occupies a first plurality of frequency domain subcarriers of the resource element set on the first time domain symbol, the demodulation reference signal occupies all frequency domain subcarriers of the resource element set on the second time domain symbol, and the first plurality of frequency domain subcarriers are the same as a second plurality of frequency domain subcarriers that are occupied by the uplink control information and that are of the resource element set;

a processor; and a non-transitory computer-readable storage medium storing a program to be executed by the processor, the program including instructions for:
obtaining the demodulation reference signal and the uplink control information from the physical uplink control channel.

* * * * *